United States Patent
Hiltzik et al.

(10) Patent No.: US 11,154,838 B2
(45) Date of Patent: Oct. 26, 2021

(54) LOW EMISSIONS, HIGH WORKING CAPACITY ADSORBENT AND CANISTER SYSTEM

(71) Applicant: Ingevity South Carolina, LLC, North Charleston, SC (US)

(72) Inventors: Laurence H. Hiltzik, Charleston, SC (US); James R. Miller, Mount Pleasant, SC (US); Roger S. Williams, Daniel Island, SC (US); Cameron I. Thomson, Charleston, SC (US); Michael G. Heim, Goose Creek, SC (US); Emma M. Card, Charleston, SC (US); Stephan Charles Cronin, Summerville, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 0 days.

(21) Appl. No.: 16/369,918

(22) Filed: Mar. 29, 2019

(65) Prior Publication Data
US 2019/0226426 A1 Jul. 25, 2019

Related U.S. Application Data

(63) Continuation-in-part of application No. 16/149,045, filed on Oct. 1, 2018, now abandoned.
(Continued)

(51) Int. Cl.
*B01J 20/28* (2006.01)
*F02M 25/08* (2006.01)
(Continued)

(52) U.S. Cl.
CPC .... *B01J 20/28002* (2013.01); *B01D 53/0415* (2013.01); *F01N 3/0835* (2013.01);
(Continued)

(58) Field of Classification Search
CPC .......... B01D 53/0407; B01D 2253/102; B01D 2253/308; B01D 2253/3425;
(Continued)

(56) References Cited

U.S. PATENT DOCUMENTS 3,864,277 A 2/1975 Kovach
4,169,747 A * 10/1979 De Rooy ................ C04B 28/14
106/779
(Continued)

FOREIGN PATENT DOCUMENTS

CN 102856081 1/2013

OTHER PUBLICATIONS

International Preliminary Report on Patentability for PCT/US2018/053823, dated Mar. 31, 2020.
(Continued)

*Primary Examiner* — Jonathan Miller
*Assistant Examiner* — Gabriel E Gitman
(74) *Attorney, Agent, or Firm* — Bryan D. Zerhusen; Nicholas R. Herrel; Cantor Colburn LLP

(57) ABSTRACT

The present description provides high working capacity adsorbents with low DBL bleed emission performance properties that allows the design of evaporative fuel emission control systems that are lower cost, simpler and more compact than those possible by prior art. Emission control canister systems comprising the adsorbent material demonstrate a relatively high gasoline working capacity, and low emissions.

14 Claims, 18 Drawing Sheets

Related U.S. Application Data

(60) Provisional application No. 62/565,699, filed on Sep. 29, 2017.

(51) Int. Cl.
  B01D 53/04 (2006.01)
  F01N 3/08 (2006.01)
  B01J 20/20 (2006.01)
  F02M 35/10 (2006.01)

(52) U.S. Cl.
  CPC ...... *F02M 25/089* (2013.01); *F02M 25/0854* (2013.01); *B01D 53/0407* (2013.01); *B01D 2253/102* (2013.01); *B01D 2253/308* (2013.01); *B01D 2253/3425* (2013.01); *B01D 2257/702* (2013.01); *B01D 2259/4516* (2013.01); *B01J 20/20* (2013.01); *B01J 20/2803* (2013.01); *B01J 20/28042* (2013.01); *B01J 20/28045* (2013.01); *B01J 20/28054* (2013.01); *F01N 3/0807* (2013.01); *F02M 35/10222* (2013.01)

(58) Field of Classification Search
  CPC ...... B01D 2257/702; B01D 2259/4516; B01D 53/0415; B01J 20/20; B01J 20/28054; B01J 20/28045; B01J 20/28011; B01J 20/28042; B01J 20/2803; F02M 25/0854; F02M 25/089; F02M 35/10222; F01N 3/0807; F01N 3/0835
  See application file for complete search history.

(56) References Cited

U.S. PATENT DOCUMENTS

| | | | |
|---|---|---|---|
| 4,677,086 A | 6/1987 | McCue et al. | |
| 4,894,072 A | 1/1990 | Turner et al. | |
| 4,999,048 A * | 3/1991 | Freepons | A01N 25/02 |
| | | | 504/339 |
| 5,039,651 A | 8/1991 | Kosaka et al. | |
| 5,162,286 A | 11/1992 | MacDowall | |
| 5,204,310 A | 4/1993 | Tolles et al. | |
| 5,250,491 A | 10/1993 | Yan | |
| 5,324,703 A | 6/1994 | McCue et al. | |
| 5,538,932 A * | 7/1996 | Yan | B01D 53/02 |
| | | | 502/424 |
| 5,863,858 A * | 1/1999 | Miller | C01B 32/384 |
| | | | 502/411 |
| 5,957,114 A | 9/1999 | Johnson et al. | |
| 6,098,601 A | 8/2000 | Reddy | |
| 6,277,179 B1 | 8/2001 | Reymonet | |
| 6,279,548 B1 | 8/2001 | Reddy | |
| 6,472,343 B1 | 10/2002 | McCrae et al. | |
| 6,540,815 B1 | 4/2003 | Hiltzik et al. | |
| 6,599,856 B1 | 7/2003 | Uchino et al. | |
| RE38,844 E * | 10/2005 | Hiltzik | B01D 53/02 |
| | | | 123/519 |
| 9,174,195 B2 | 11/2015 | Yamasaki et al. | |
| 9,322,368 B2 | 4/2016 | Arase et al. | |
| 9,657,691 B2 | 5/2017 | Eguchi et al. | |
| 9,732,649 B2 | 8/2017 | Hiltzik et al. | |
| 2006/0154815 A1 | 7/2006 | Abe et al. | |
| 2008/0063592 A1 | 3/2008 | Nakahara et al. | |
| 2010/0212496 A1 | 8/2010 | Hanamoto | |
| 2013/0186375 A1 | 7/2013 | Hasegawa | |
| 2015/0184621 A1* | 7/2015 | Arase | F02M 25/0854 |
| | | | 96/131 |
| 2015/0275727 A1* | 10/2015 | Hiltzik | F02M 25/089 |
| | | | 123/519 |
| 2016/0271555 A1 | 9/2016 | Hiltzik et al. | |
| 2018/0207611 A1 | 7/2018 | Byrne et al. | |

OTHER PUBLICATIONS

U.S. Appl. No. 16/149,045, filed Oct. 1, 2018, US 2019-0101083 A1.
International Search Report and Written Opinion for PCT/US2018/053823 dated, Jan. 1, 2019.
U.S. Appl. No. 16/149,045, filed Oct. 1, 2018.

* cited by examiner

LOW EMISSIONS, HIGH WORKING CAPACITY ADSORBENT AND CANISTER SYSTEM

CROSS-REFERENCE TO RELATED APPLICATIONS

This application claims the benefit of priority to U.S. Provisional Patent Application Ser. No. 62/565,699 titled: LOW EMISSIONS, HIGH WORKING CAPACITY ADSORBENT AND CANISTER SYSTEM, filed Sep. 29, 2017, and U.S. patent application Ser. No. 16/149,045 titled: LOW EMISSIONS, HIGH WORKING CAPACITY ADSORBENT AND CANISTER SYSTEM, filed Oct. 1, 2018; which are hereby incorporated by reference in their entirety for all purposes.

BACKGROUND

1. Field of the Discovery

The present disclosure, in various embodiments, relates generally to evaporative emission control systems.

2. Background Information

Evaporation of gasoline fuel from motor vehicle fuel systems is a major potential source of hydrocarbon air pollution. These fuel vapor emissions occur when the vehicle is running, refueling, or parked—engine off. Such emissions can be controlled by the canister systems that employ activated carbon to adsorb the fuel vapor emitted from the fuel systems. Under certain modes of engine operation, the adsorbed fuel vapor is periodically removed from the activated carbon by purging the canister systems with ambient air to desorb the fuel vapor from the activated carbon. The regenerated carbon is then ready to adsorb additional fuel vapor.

It is well known in the art that a more space efficient activated carbon adsorbent for this application is characterized by an n-butane vapor adsorption isotherm that has adsorption capacity steeply sloped towards high vapor partial pressures (U.S. Pat. No. 6,540,815). In that way, the adsorbent has a high capacity at relatively high concentrations of the type of vapors present with gasoline fuel, and the adsorbent favors release of these captured vapors when exposed to a low vapor concentration or partial pressure, such as during purge. These high performance activated carbons have a large amount of pore volume as "small mesopores" (e.g., SAE Technical Papers 902119 and 2001-03-0733, and Burchell 1999, pp. 252-253), which are preferably about 1.8 nm to about 5 nm in size as measured by the BJH method of analysis of nitrogen adsorption isotherms (e.g., U.S. Pat. No. 5,204,310). (According to IUPAC classification, these are pores of about 1.8-2 nm size within the <2 nm micropore size range, plus pores of about 2-5 nm size within the 2-50 nm mesopore size range). The small mesopores are sufficiently small to capture vapors as a condensed phase, and yet readily empty upon exposure to a low partial pressure of vapor. Accordingly, the volume in these pores correlates linearly with the recoverable vapor capacity by the adsorbent in a canister volume, known as gasoline working capacity (GWC), and likewise correlates linearly with the ASTM butane working capacity (BWC) of the adsorbent, as measured by the standard ASTM 5228 method, which are incorporated herein by reference. Generally, the range of ASTM BWC of commercial activated carbon products for this application is from about 3 to about 17 g/dL, with 9+ g/dL BWC carbons favored for working capacity towards the fuel vapor source of the canister system, and lower BWC carbons used in one or more subsequent volumes towards the atmosphere port or vent-side (i.e., vent-side adsorbent volumes). Generally, cylindrical pellet and other engineered shaped (e.g., spherical granule) activated carbons are preferred over irregularly shaped or crushed particulates, especially for canister systems where moderated flow restriction is required such as for vapor capture during refueling. Advantages of pelletized and engineered shaped activated carbons include good mechanical strength, low dust, low dusting rate, high on-size yield in processing, and a narrow particle size distribution that provides consistency across liter-size canister fills after bulk shipment and handling.

Several approaches have been described for preparing pelletized and engineered shaped activated carbons. One group of approaches involves binding carbon powder that is already activated ("grind & bind"). For example, U.S. Pat. No. 4,677,086 describes the use of a bentonite clay binder, U.S. 20060154815A1 describes acrylic or acryl-styrene emulsion with CMC binder system, U.S. Pat. No. 6,277,179 describes thermosetting resin binders, and U.S. Pat. No. 6,472,343 describes crosslinked binder, such as carboxymethyl cellulose (CMC). Advantages of grind & bind include control of mechanical strength and dusting properties in post-activation processing, independent of the pore-forming activation process. However, the nonadsorptive binders are a diluent, and the grind & bind processing can damage the adsorbent carbon porosity. See U.S. Pat. No. 6,277,179 and its references for the problem of loss in adsorptive properties due to pore blocking and contamination from binders. Furthermore, inert atmospheres are needed with certain binders that require heat treatments in order to avoid combustion of the activated carbon ingredient, and, regardless, collapse of adsorptive porosity can occur, especially for activated carbon ingredients not previously exposed to such elevated temperatures during activation processing. Nevertheless, the grind & bind approach is useful for providing moderate levels of BWC in pelletized activated carbons (e.g., about 9.5 to 12 g/dL BWC). Example commercial products favored for working capacity towards the fuel vapor source are clay-bound NUCHAR® BAX 950, BAX 1000, and BAX 1100 and organic-bound NUCHAR® BAX 1100LD (Ingevity Corporation, North Charleston, S.C.), which all have BWC properties below 12.3 g/dL.

The grind & bind approach is also useful in forming specially shaped pellets (e.g., U.S. Pat. Nos. 9,174,195 and 9,322,368, with commercial example of MPAC1 (Kuraray Chemical Ltd, Bizen-shi Japan), volumetrically diluted pellets (U.S. RE38,844 with a commercial example of NUCHAR® BAX LBE), and high heat capacity pellets (U.S. Pat. No. 6,599,856). As a consequence of the special shaping and non-adsorptive additives, the BWC of the pelletized activated carbon is diluted in each case to below 9.5 g/dL and they are effective for suppressing diurnal bleed emissions when these special pellets are in vent-side volumes within the canister system.

Another group of approaches for preparing pelletized activated carbon involves first shaping a carbonaceous precursor or char, and then activating for forming the adsorptive porosity ("shape & activate"). See, e.g., U.S. Pat. Nos. 5,039,651, 5,204,310, 5,250,491, 5,324,703, EP 0 423 967B1, and CN102856081 for acid activation processes, and U.S. 20080063592A1 for a thermal activation process. These methods are essentially "binderless" in that the component providing structural integrity and mechanical strength to the shaped material is a native constituent of the carbonaceous precursor, or if a resin or pitch binder ingredient is added (e.g., U.S. Pat. Nos. 3,864,277 and 5,538,932), the binder ingredient is converted to activated carbon in the process, thus also contributing to the adsorptive performance of the final product. U.S. Pat. No. 5,324,703 employs phosphoric acid activation with sawdust for preparing activated carbon pellets with BWC properties as high as 17 g/dL, by a process that minimizes macropore volume and thus maximizes the volumetric content in the pellet of pores in the target 1.8-5 nm size range that are known to be effective for gasoline vapor working capacity. These shape & activate methods are efficient means to provide the greatest volume of adsorptive pores per liter of canister fill, without non-adsorptive additives or fillers. The activated carbons prepared by shape & activate processes are the shaped product itself, as the process does not require subsequent grinding, metering of binder and pore-protecting ingredients, shaping, and further drying and heat treatments. Commercial examples of shape & activate include NUCHAR® BAX 1500, BAX 1500E, BAX 1700 (Ingevity Corporation, N. Charleston, S.C., USA); CNR 115, CNR 120, CNR 150 (Cabot Corporation, Boston, Mass., USA), 3GX (Kuraray Chemical Ltd, Bizen-shi Japan), and KMAZ2 and KMAZ3 (Fujian Xinsen Carbon, Fujian Sheng, China). The BWC properties for these shape & activate products range from about 11 g/dL to about 17 g/dL. Shape & activate technology has been the accepted and only commercial technology for high working capacity carbon pellets for evaporative emission control (e.g., defined here as BWC above 13 g/dL), for the reasons of economy of process steps, lower manufacturing costs, and effectiveness for instilling the highest BWC properties. The advantages of the high working capacity for canister systems include reducing the size and weight of the canister system by requiring less activated carbon volume, and by increasing the bed volumes of purge available (liters purge per liters of canister system) which is a key factor for system working capacity and emissions performance. See, e.g., SAE papers 2000-01-0895 and 2001-01-0733.

Though a highly mesoporous adsorbent is favored for working capacity, high ASTM BWC of the adsorbent and its high GWC appear to run counter, in practice, from the concurrent need of the fuel vapor emission control system to provide low emissions even when the vehicle is not operating.

For example, an increase in environmental concerns has continued to drive strict regulations of those hydrocarbon emissions. When a vehicle is parked in a warm environment during the daytime heating (i.e., diurnal heating), the temperature in the fuel tank increases resulting in an increased vapor pressure in the fuel tank. Normally, to prevent the leaking of the fuel vapor from the vehicle into the atmosphere, the fuel tank is vented through a conduit to a canister containing suitable fuel adsorbent materials that can temporarily adsorb the fuel vapor. The canister defines a vapor or fluid stream path such that when the vehicle is at rest the fuel vapor of fluid passes from the fuel tank, through the fuel tank conduit, through one or more adsorbent volumes, and out to a vent port, which opens to the atmosphere. A mixture of fuel vapor and air from the fuel tank enters the canister through a fuel vapor inlet of the canister and diffuses into the adsorbent volume where the fuel vapor is adsorbed in temporary storage and the purified air is released to the atmosphere through a vent port of the canister. Once the engine is turned on, ambient air is drawn into the canister system through the vent port of the canister. The purge air flows through the adsorbent volume inside the canister and desorbs the fuel vapor adsorbed on the adsorbent volume before entering the internal combustion engine through a fuel vapor purge conduit. The purge air does not desorb the entire fuel vapor adsorbed on the adsorbent volume, resulting in a residue hydrocarbon ("heel") that may be emitted to the atmosphere.

In addition, the heel in local equilibrium with the gas phase also permits fuel vapors from the fuel tank to migrate through the canister system as emissions. Such emissions typically occur when a vehicle has been parked and subjected to diurnal temperature changes over a period of several days, commonly called "diurnal breathing loss" (DBL) emissions. The California Low Emission Vehicle Regulations make it desirable for these DBL emissions from the canister system to be below 10 mg ("PZEV") for a number of vehicles beginning with the 2003 model year and below 50 mg, typically below 20 mg, ("LEV-II") for a larger number of vehicles beginning with the 2004 model year.

Now the California Low Emission Vehicle Regulation (LEV-III) and United States Federal Tier 3 regulations require canister DBL emissions not to exceed 20 mg as per the Bleed Emissions Test Procedure (BETP) as written in the California Evaporative Emissions Standards and Test Procedures for 2001 and Subsequent Model Motor Vehicles, Mar. 22, 2012. Furthermore, the regulations on DBL emissions continue to create challenges for the evaporative emission control systems, especially when the level of purge air is low. For example, the potential for DBL emissions may be more severe for a hybrid vehicle, including a vehicle whose powertrain is both an internal combustion engine and an electric motor ("HEV"), and a vehicle where there is a start-stop system/stop-start system that automatically shuts down and restarts the internal combustion engine to reduce the amount of time the engine spends idling, thereby reducing fuel consumption and tailpipe emissions. In such hybrid vehicles, the internal combustion engine is turned off nearly half of the time during vehicle operation. Since the adsorbed fuel vapor on the adsorbents is purged only when the internal combustion engine is on, the adsorbents in the canister of a hybrid vehicle is purged with fresh air less than half of the time compared to conventional vehicles and frequently within the range of 55 BV to 100 BV, where "BV" is the ratio of the total volume of purge flow relative to the volumes of adsorbent in the canister system. And yet, hybrid vehicles generate nearly the same amount of evaporative fuel vapor as conventional vehicles. The lower purge frequency and lower purge volume of the hybrid vehicle can be insufficient to clean the residue hydrocarbon heel from the adsorbents in the canister, resulting in high DBL emissions. Other powertrains when engineered for optimum drive performance, fuel efficiency and tailpipe emissions, are similarly challenged to provide a high level of purge for refreshing the canister and are challenged to provide optimum air-fuel mixtures and rates to the engine. These powertrains include turbocharged or turbo-assisted engines, and gasoline direct injection ("GDI") engines.

Globally, by contrast, evaporative emission regulations have been less stringent than in the US, but the trend is now for more stringent regulations, along the path that the US has taken. There is increased recognition of the benefits from tighter controls for better use of vehicle fuel and for cleaner air, especially in regions where light duty vehicle use is growing rapidly and air quality issues require urgent attention. As a notable example, the Ministry of Environmental Protection of the People's Republic of China released regulations in 2016 that include limitations on fuel vapor emissions, for implementation in 2020 (See "Limits and Measurement Methods for Emissions from Light-Duty Vehicles, GB 18352.6-2016, also known as "China 6"). This standard specifies the limits and measurement methods for light-duty vehicles, including hybrid electric vehicles, equipped with positive ignition engines for exhaust emissions in regular and low temperatures, real driving emissions (RDE), crankcase emissions, evaporative emissions and refueling emissions, technical requirements, and measurement methods of the durability for pollution control equipment, and onboard diagnostic system (OBD). Onboard refueling vapor recovery (ORVR) is required, in addition to evaporative emission control. Evaporative emissions are defined as the hydrocarbon vapors emitted from the fuel (gasoline) system of a motor vehicle, and includes: (1) fuel tank breathing losses (diurnal losses), which are hydrocarbon emissions caused by temperature changes in the fuel tank, and (2) hot soak losses, which are hydrocarbon emissions arising from the fuel system of a stationary vehicle after a period of driving. While the testing protocol and the emissions limits for the whole vehicle testing are provided in the regulations, there is leeway in the allocation by the vehicle manufacturers for the design limits of the components contributing to the total emissions (e.g., evaporative emission control canister system, fuel tank walls, hoses, tubing, etc.). Among the allocations, the limit for the evaporative emission control canister system is generally set in the fuel system and vehicle design processes to be less than 100 mg for the day 2 DBL emissions as part of the design balance for meeting the overall vehicle requirements of China 6 regulations.

Yet, in the face of the needs for high working capacity performance and for designing systems for fuel emissions within regulatory limits, there is a disproportionate increase in the bleed emissions performance as GWC performance and BWC properties are increased, as is well known in the art. See, e.g., SAE Technical Paper 2001-01-0733 at FIG. 8 (comparison of DBL emissions data); and U.S. Pat. No. 6,540,815 at Table (comparative and inventive data for 11 BWC versus 15 BWC activated carbons).

For satisfying the apparently opposing needs of high working capacity and low DBL emission performance, several approaches have been reported. One approach is to significantly increase the volume of purge gas to enhance desorption of the residue hydrocarbon heel from the adsorbent volume. See U.S. Pat. No. 4,894,072. This approach, however, has the drawback of complicating management of the fuel/air mixture to the engine during the purge step and tends to adversely affect tailpipe emissions, and such high levels of purge are simply unavailable for certain powertrain designs. Though at the cost of design and installation, an auxiliary pump may be employed at some location within the evaporative emission control system to supplement, assist, or augment the purge flow or volume, as a means to complement the engine vacuum and to avoid some issues with engine performance and tailpipe emission control when otherwise depending on the engine vacuum alone.

Another approach is to design the canister to have a relatively low cross-sectional area on the vent-side of the canister, either by the redesign of existing canister dimensions or by the installation of a supplemental vent-side canister of appropriate dimensions. This approach reduces the residual hydrocarbon heel by increasing the intensity of purge air. One drawback of such approach is that the relatively low cross-sectional area imparts an excessive flow restriction to the canister. See U.S. Pat. No. 5,957,114.

Another approach for increasing the purge efficiency is to heat the purge air, or a portion of the adsorbent volume having adsorbed fuel vapor, or both. However, this approach increases the complexity of control system management and poses some safety concerns. See U.S. Pat. Nos. 6,098,601 and 6,279,548.

Another approach is to route the fuel vapor through a fuel-side adsorbent volume, which is located proximal to the fuel source in the fluid stream, and then at least one subsequent (i.e., vent-side) adsorbent volume, which is located down-stream from the fuel-side adsorbent, prior to venting to the atmosphere, wherein the fuel-side adsorbent volume (herein, the initial adsorbent volume") has a higher isotherm slope, defined as an incremental adsorption capacity, than the subsequent (i.e., vent-side) adsorbent volume. See U.S. Pat. No. RE38,844. It is notable that U.S. RE38,844 considers the trade-off in DBL bleed emissions performance with BWC as an inevitable consequence of the high slope properties of the adsorption isotherms that are present with high BWC adsorbents according to the dynamics of vapor and adsorbate concentration gradients along the vapor flow path during adsorption, purge, and soak cycles. This approach has the drawback of requiring multiple adsorbent volumes in-series with varied properties for affording the low emissions, which increases system size, complexity, and cost for design and fabrication.

Another approach, especially useful when only a low level of purge might be available, is to route the fuel vapor through at least one subsequent (i.e., vent-side) adsorbent comprising a window of incremental adsorption capacity, ASTM BWC, a particular g-total BWC capacity, and substantially uniform structure that facilitates approximately uniform air and vapor flow distribution across its flow path cross section. See U.S. Pat. No. 9,732,649 and U.S. 2016/0271555A1. This approach also has the drawback of requiring multiple adsorbent volumes in-series with varied properties for affording the low emissions, which increases system size, complexity, and cost for design and fabrication.

The DBL emissions challenge for high working capacity carbons in the evaporative emission control canister system is recognized in U.S. Pat. No. 9,322,368, where it is asserted that including a low working capacity volume towards the vent-side puts an undue burden on the size and weight of the canister system for meeting both the high working capacity and the maximum allowable DBL emission targets. The alternative solution taught in U.S. Pat. No. 9,322,368 is to have a volume towards the vent-side of the canister system that contains a hollow pellet where the volume of pores in the macropore size range 0.05-0.5 micron within the pellet structure is controlled in the examples to about 50% of the total having a size of 0.05-100 microns. The '368 discloses that with 90+% of total macropore volume in pores 0.05-0.5 micron has inferior desorption performance. These examples were prepared by a grind & bind process which included a powder ingredient that decomposed upon process heating in order to create macropore volume.

The dilemma of DBL emissions challenge for high working capacity is also recognized in U.S. Pat. No. 9,657,691. Here a solution is taught for a main canister with a large capacity for fuel vapor is combined with a smaller buffer canister with a chamber containing activated carbon with BWC above 13 g/dL, then in-series with a subsequent chamber containing carbon with BWC between 6 and 10 g/dL that is needed to constrain the emissions to target levels. A further complexity of adding heat to a buffer canister chamber is necessary to achieve target emissions levels. Thus, the dilemma of excessive DBL bleed emissions for high working capacity carbons is recognized, in this instance of an auxiliary chamber, and countered by added size and complexity for the canister system.

Accordingly, it is desirable to have an evaporative emission control system that is as low cost, simple, and compact as possible for both providing the needed GWC and low DBL emission levels. Therefore, a high working capacity adsorbent that has relatively low DBL emission properties would contribute to that end by allowing smaller, less costly, and less complicated approaches for system design and operation, both for when normal levels or low levels of purge are available.

SUMMARY

Presently described is an adsorbent material that surprisingly and unexpectedly demonstrates relatively high working capacity and, at the same time, demonstrates relatively low DBL bleed emission performance properties when incorporated into a vehicle emissions canister system. The described material advantageously allows the design of evaporative fuel emission control systems that are lower cost, simpler and more compact than currently known. As described herein, when tested under a standard vapor cycling protocol, the test canister containing an adsorbent as described herein with a relatively high ASTM BWC, demonstrated lower emissions using standard bleed emission test procedure (BETP) than current, conventional high ASTM BWC adsorbents.

Thus, in one aspect, the description provides a shaped adsorbent material comprising a relatively high working capacity activated adsorbent powder bound with a binder, e.g., an organic binder such as carboxymethyl cellulose (CMC) or an inorganic binder, such as bentonite clay. In certain embodiments, the shaped adsorbent material comprises an admixture of a binder and an activated adsorbent powder derived by grinding an activated adsorbent precursor, wherein the admixture is shaped into a form, and wherein the shaped adsorbent material has an ASTM BWC of at least 13 g/dL.

In any of the aspects or embodiments described herein, the activated adsorbent powder has a powder butane activity (pBACT) of at least 50 g/100 g.

In any of the aspects or embodiments described herein, the shaped adsorbent material comprises a ratio of pore volumes of 0.05-1 micron to 0.05-100 micron as described herein, e.g., of greater than about 80%.

In any of the aspects or embodiments described herein, the shaped adsorbent material comprises a ratio of pore volumes of 0.05-0.5 micron to 0.05-100 microns as described herein, e.g., that is greater than about 50%.

In certain embodiments, the shaped adsorbent material has a ratio of pore volumes of 0.05-1 micron to 0.05-100 micron as described herein, e.g., of greater than about 80%, a ratio of pore volumes of 0.05-0.5 micron to 0.05-100 microns as described herein, e.g., that is greater than about 50%, and a ASTM BWC as described herein, e.g., that is greater than about 13 g/dL.

In any of the aspects or embodiments described herein, the activated adsorbent precursor is an activated carbon precursor. In any of the aspects or embodiments described herein, the activated carbon precursor has a butane activity (pBACT) of at least about 50 g/100 g.

In any of the aspects or embodiments described herein, the binder comprises at least one of an organic binder, an inorganic binder or both. In certain embodiments, the binder comprises, e.g., an organic binder such as carboxymethyl cellulose (CMC) or an inorganic binder, such as bentonite clay or both.

In any of the aspects or embodiments described herein, the shaped adsorbent material includes a component selected from the group consisting of activated carbon, carbon charcoal, zeolites, clays, porous polymers, porous alumina, porous silica, molecular sieves, kaolin, titania, ceria, and combinations thereof.

In any of the aspects or embodiments described herein, the shaped adsorbent material comprises activated carbon derived from a material including a member selected from the group consisting of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, and combinations thereof. In any of the aspects or embodiments described herein, the shaped adsorbent material comprises activated carbon derived from at least one of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables or a combination thereof.

In any of the aspects or embodiments described herein, the form of shaped adsorbent material is selected from a granule, pellet, sphere, honeycomb, monolith, pelletized cylindrical, particulate media of uniform shape, particulate media of non-uniform shape, structured media of extruded form, structured media of poured form, hollow-cylinder, star, twisted spiral, asterisk, configured ribbons, and combinations thereof.

In any of the aspects or embodiments described herein, the shaped adsorbent material is formed into a structure comprising a matrix with approximately uniform cell or geometric structure, e.g., a honeycomb configuration, which permits or facilitates approximately uniform air or vapor flow distribution through the subsequent adsorbent volume.

In another aspect, the disclosure provides an evaporative emission control canister system comprising at least one fuel-side adsorbent volume and at least one vent-side adsorbent volume, wherein at least one of the at least one fuel-side or the at least one vent-side adsorbent volumes comprises a shaped adsorbent material as described herein.

In any of the aspects or embodiments described herein, the canister system comprises one or more vent-side adsorbent volumes having a uniform cell structure at or near the end of the fuel vapor flow path.

In any of the aspects or embodiments described herein, the shaped adsorbent material demonstrates two-day diurnal breathing loss (DBL) emissions of 100 mg or less at 315 liters of purge applied after a 40 g/hr butane loading step as determined in a 2.1 liter canister as defined herein (i.e., the "Defined Canister") by the 2012 California Bleed Emissions Test Procedure (BETP).

In any of the aspects or embodiments described herein, the system has two-day diurnal breathing loss (DBL) emissions of less than 100 mg when tested by the China 6 Type Test Procedure as defined herein.

In certain additional embodiments, the shaped adsorbent material has a two-day DBL that is at least 10% less than the precursor activated adsorbent material.

In any of the embodiments described herein, the evaporative emission control system may further comprise a heating unit.

In an additional aspect, the description provides methods for reducing fuel vapor emissions in an evaporative emission control system, the method comprising contacting the fuel vapor with an evaporative emission control system as described herein, comprising a shaped adsorbent material as described herein.

In another aspect, the description provides a shaped adsorbent material produced according to the steps comprising: (a) providing an activated adsorbent precursor; (b) grinding the activated adsorbent precursor to a powder, wherein the powder has a pBACT of at least about 50 g/100 g; (c) admixing the powder with a binder material; and (d) shaping the powder and binder material mixture into a form, wherein the shaped adsorbent material has an ASTM BWC of at least 13 g/dL. In certain embodiments, the shaped adsorbent material further has at least one of: (i) a ratio of pore volumes of 0.05-1 micron to 0.05-100 microns that is greater than about 80%, (ii) a ratio of pore volumes of 0.05-0.5 micron to 0.05-100 microns that is greater than about 50%, or (iii) a combination thereof.

The preceding general areas of utility are given by way of example only and are not intended to be limiting on the scope of the present disclosure and appended claims. Additional objects and advantages associated with the compositions, methods, and processes of the present invention will be appreciated by one of ordinary skill in the art in light of the instant claims, description, and examples. For example, the various aspects and embodiments of the invention may be utilized in numerous combinations, all of which are expressly contemplated by the present description. These additional advantages objects and embodiments are expressly included within the scope of the present invention. The publications and other materials used herein to illuminate the background of the invention, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. Further objects, features and advantages of the invention will become apparent from the following detailed description taken in conjunction with the accompanying figures showing illustrative embodiments of the invention, in which.

DETAILED DESCRIPTION

Figure 1:
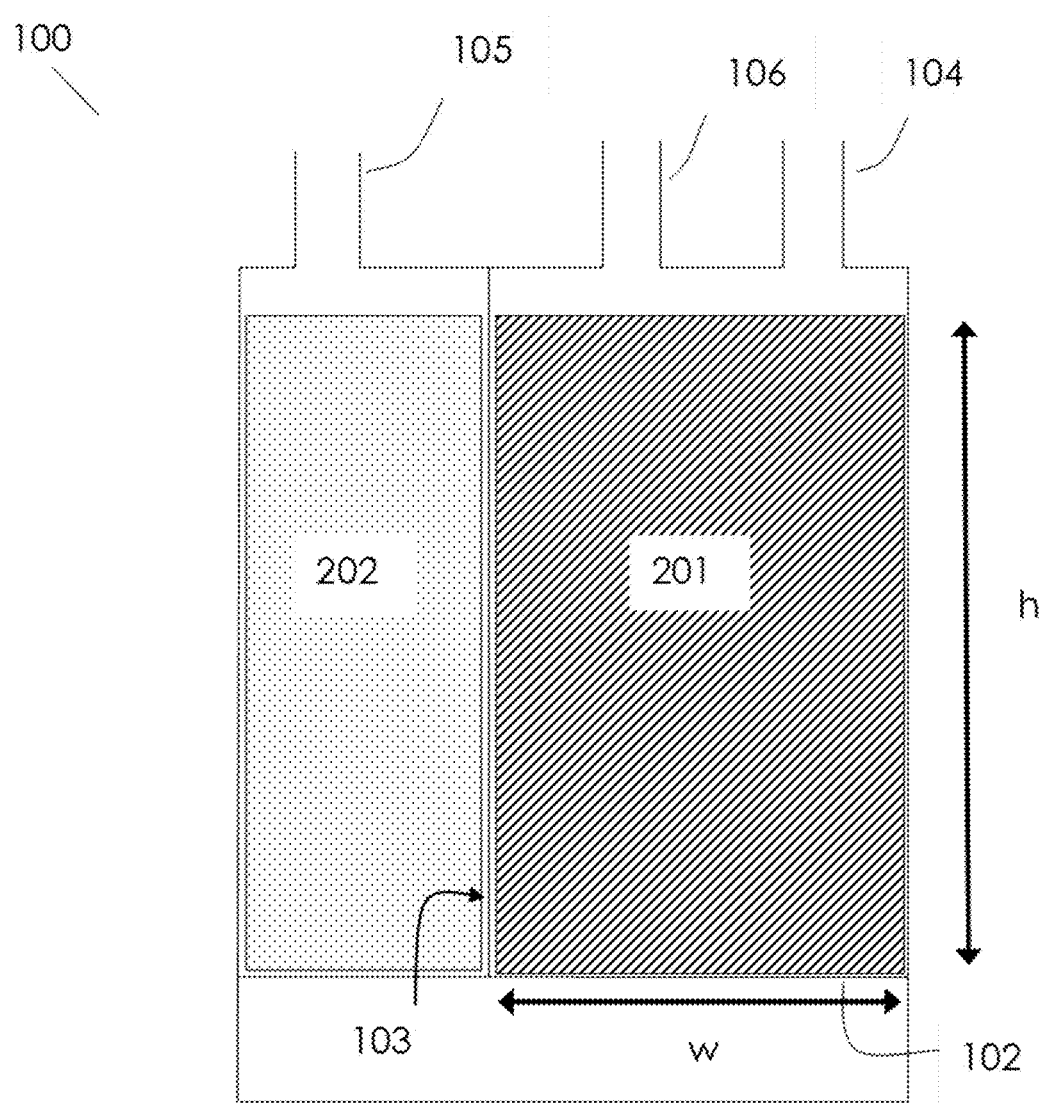
FIG. 1 is a cross-sectional views of evaporative emission control canister systems with many possible combinations of where the inventive embodiments of the adsorbent may be utilized.

The present disclosure now will be described more fully hereinafter, but not all embodiments of the disclosure are shown. While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present application. Additionally, the drawings are not drawn to scale. Elements common between figures may retain the same numerical designation.

Where a range of values is provided, it is understood that each intervening value between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

The following terms are used to describe the present invention. In instances where a term is not specifically defined herein, that term is given an art-recognized meaning by those of ordinary skill applying that term in context to its use in describing the present invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

As used herein, the terms "fluid," "gas" or "gaseous" and "vapor" or "vaporous" are used in a general sense and, unless the context indicates otherwise, are intended to be interchangeable.

As used herein, unless the context indicates otherwise, the term "shaped adsorbent" or "shaped adsorbent material" is intended to refer to a high activity or high BWC activated adsorbent material that has been ground to a powder, bound using a binder and shaped as described herein (i.e., "grind and bind"), and that provides the described and claimed porosity and system advantages. The above terms are to be distinguished from the description's reference to "shaped and activated" materials, which specifically refers to a precursor carbon material that was bound and shaped prior to activation.

U.S. patent application Ser. No. 15/656,643 titled: Particulate Adsorbent Material and Methods of Making the Same, filed 21 Jul. 2017; U.S. Patent Publication US 2016/0271555A; U.S. Pat. Nos. 9,732,649; and 6,472,343 are hereby incorporated by reference in their entirety for all purposes.

Described herein are shaped adsorbent materials and systems that surprisingly and unexpectedly demonstrate a high working capacity adsorbent with relatively low DBL bleed emission performance properties, including at relatively low purge volumes, which allows the design of evaporative fuel emission control systems that are lower cost, simpler, and more compact than those currently available.

Thus, in one aspect, the description provides a shaped adsorbent material comprising an admixture of a binder and an activated adsorbent powder derived by grinding an activated adsorbent precursor, wherein the admixture is shaped into a form, and wherein the shaped adsorbent material has an ASTM BWC property of at least about 13 g/dL.

In certain embodiments, the shaped adsorbent material as described herein has an ASTM BWC that is greater than about 13 g/dL. In certain embodiments, the shaped adsorbent material as described herein has an ASTM BWC of greater than about 13 g/dL, 14 g/dL, 15 g/dL, 16 g/dL, 17 g/dL, 18 g/dL, 19 g/dL, 20 g/dL, 21 g/dL, 22 g/dL, 23 g/dL, 24 g/dL, 25 g/dL, or more than 25 g/dL, or from about 13 g/dL to about 40 g/dL, from about 13 g/dL to about 30 g/dL, or from about 13 g/dL to about 20 g/dL, and including all overlapping ranges, subsumed ranges and values in between.

Without being bound by any particular theory, the unexpectedly high BWC and low DBL of the described shaped adsorbent material described herein appears correlated with selection of a precursor material with very high butane activity. Therefore, in any aspect or embodiment described herein, the activated adsorbent powder, e.g., activated carbon powder, has a butane activity (pBACT) of at least about 50 g/100 g. In certain embodiments, the pBACT of the activated adsorbent precursor is at least about 50 g/100 g, 55 g/100 g, 60 g/100 g, 65 g/100 g, 70 g/100 g, 75 g/100 g, 80 g/100 g, 85 g/100 g, 90 g/100 g, 95 g/100 g or more including all values in between. In certain embodiments, the pBACT of the activated adsorbent powder, e.g., activated carbon powder, is from about 50 g/100 g to about 95 g/100 g, from about 50 g/100 g to about 90 g/100 g, from about 50 g/100 g to about 85 g/100 g, from about 50 g/100 g to about 80 g/100 g, from about 50 g/100 g to about 75 g/100 g, from about 50 g/100 g to about 70 g/100 g, from about 50 g/100 g to about 65 g/100 g, about 50 g/100 g to about 60 g/100 g, and including all overlapping ranges, subsumed ranges and values in between.

Generally, the larger the surface area of the activated carbon, the greater its adsorption capacity. The available surface area of activated carbon is dependent on its pore volume. Since the surface area per unit volume decreases as individual pore size increases, large surface area generally is maximized by maximizing the number of pores of very small dimensions and/or minimizing the number of pores of very large dimensions. Pore sizes are defined herein as micropores (pore width <1.8 nm), mesopores (pore width=1.8-50 nm), and macropores (pore width >50 nm, and nominally 50 nm-100 microns). Mesopores may be further divided between small mesopores (pore width=1.8-5 nm) and large mesopores (pore width=5-50 nm).

In certain embodiments, the shaped adsorbent material as described herein has a ratio of pore volumes of 0.05-1 micron to 0.05-100 micron that is greater than about 80%, or about 90%, including all values in between. In certain embodiments, the ratio of pore volumes of 0.05-1 micron to 0.05-100 micron is about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% including all values in between. In certain embodiments, the ratio of pore volumes of 0.05-1 micron to 0.05-100 micron is from 80-85%, 80-90%, 80-95%, 80-99%, 82-85%, 82-90%, 82-95%, 82-99%, 85-90%, 85-95%, 85-99%, 90-95%, or 90-99%, and including all overlapping ranges, subsumed ranges and values in between.

In certain embodiments, the shaped adsorbent material as described herein has a ratio of pore volumes of 0.05-0.5 micron to 0.05-100 microns that is greater than about 50%, greater than about 60%, greater than about 70%, greater than about 80%, or greater than about 90%, including all values in between. In certain embodiments, the ratio of pore volumes of 0.05-0.5 micron to 0.05-100 microns is about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99%. In certain embodiments, the ratio of pore volumes of 0.05-0.5 micron to 0.05-100 microns is from about 50-99%, about 50-95%, about 50-90%, about 50-85%, about 50-80%, about 50-75%, about 50-70%, about 50-65%, about 50-60%, about 50-55%, about 55-99%, about 55-95%, about 55-90%, about 55-85%, about 55-80%, about 55-75%, about 55-70%, about 55-65%, about 55-60%, about 60-99%, about 60-95%, about 60-90%, about 60-85%, about 60-80%, about 60-75%, about 60-70%, about 60-65%, about 65-99%, about 65-95%, about 65-90%, about 65-85%, about 65-80%, about 65-75%, about 65-70%, about 70-99%, about 70-95%, about 70-90%, about 70-85%, about 70-80%, about 70-75%, about 75-99%, about 75-95%, about 75-90%, about 75-85%, about 75-80%, about 80-99%, about 80-95%, 80-90%, about 80-85%, about 85-99%, about 85-95%, about 85-90%, about 90-99%, or about 90-95% and including all overlapping ranges, subsumed ranges and values in between.

In certain embodiments, the description provides a shaped adsorbent material comprising a ratio of pore volumes of 0.05-1 micron to 0.05-100 micron as described herein, e.g., of greater than about 80%, greater than about 90% or more, a ratio of pore volumes of 0.05-0.5 micron to 0.05-100 microns as described herein, e.g., that is greater than about 50%, greater than about 60%, greater than about 70%, greater than about 80%, or greater than about 90%, and a ASTM BWC as described herein, e.g., that is greater than about 13 g/dL, or 14 g/dL, or 15 g/dL, or 16 g/dL, or 17 g/dL, or 18 g/dL, or 19 g/dL, or 20 g/dL, or 21 g/dL, or 22 g/dL, or 23 g/dL, or 24 g/dL, or 25 g/dL, or more than 25 g/dL, or from about 13 g/dL to about 40 g/dL, or from about 13 g/dL to about 30 g/dL, or from about 13 g/dL to about 20 g/dL, and including all values in between.

In certain embodiments, the activated adsorbent powder as described herein is derived by grinding an activated carbon precursor, wherein the activated carbon precursor is derived from at least one of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, synthetic polymer, natural polymer, lignocellulosic material, or a combination thereof. In any of the aspects or embodiments described herein, the activated carbon precursor has a butane activity (pBACT) as described herein.

In any of the aspects or embodiments described herein, the shaped adsorbent material includes a component selected from the group consisting of activated carbon, carbon charcoal, zeolites, clays, porous polymers, porous alumina, porous silica, molecular sieves, kaolin, titania, ceria, and combinations thereof.

In any of the aspects or embodiments, the adsorbent material comprises, e.g., a high activity (i.e., high working capacity) activated carbon powder bound with one or more binders, e.g., an organic binder such as carboxymethyl cellulose (CMC) or an inorganic binder, such as bentonite clay, or a combination of binders. In certain embodiments, the binder comprises at least one of a clay or a silicate material. For example, in certain embodiments, the binder is at least one of zeolite clay, bentonite clay, montmorillonite clay, illite clay, French green clay, pascalite clay, redmond clay, terramin clay, living clay, Fuller's Earth clay, ormalite clay, vitallite clay, rectorite clay, cordierite, ball clay, kaolin or a combination thereof.

Additional potential binders include, thermosetting binders and hot-melt binders. Thermosetting binders are compositions based on thermosetting resins which are liquid or solid at ambient temperature and in particular those of urea-formaldehyde, melamine-urea-formaldehyde or phenol-formaldehyde type, resins of melamine-urea-formaldehyde type being preferred as well as emulsions of thermosetting (co)polymers in the latex foam. Crosslinking agents can be incorporated in the mixture. Mention may be made, as example of crosslinking agents, of ammonium chloride. Hot-melt binders are generally solid at ambient temperature and are based on resins of hot-melt type. Use may also be made, as binders, of pitch, tar or any other known binder.

In any of the embodiments described herein, the binder can comprise an aqueous soluble binders (e.g., polar binders), including but not limited to cellulosic binders and related esters, including methyl and ethyl cellulose and their derivatives, e.g., carboxymethyl cellulose (CMC), ethylcellulose, ethyl methyl cellulose, hydroxyethyl cellulose, hydroxypropyl cellulose (HPC), hydroxyethyl methyl cellulose, hydroxypropyl methyl cellulose (HPMC), ethyl hydroxyethyl cellulose, crystalline salts of aromatic sulfonates, polyfurfuryl alcohol, polyester, polyepoxide or polyurethane polymers etc.

In any of the embodiments described herein, the binder can comprise an non-aqueous binder, such as clays, phenolic resins, lignins, linosulfonates, polyacrylates, poly vinyl acetates, polyvinylidene chloride (PVDC), ultra-high molecular weight polyethylene (UHMWPE), etc., fluoropolymer, e.g., polyvinylidene difluoride (PVDF), polyvinylidene dichloride (PVDC), a polyamide (e.g., Nylon-6,6' or Nylon-6), a high-performance plastic (e.g. polyphenylene sulfide), polyketones, polysulfones, and liquid crystal polymers, copolymers with a fluoropolymer (e.g. poly(vinylidene difluoride)), polytetrafluoroethylene (PTFE), fluorinated ethylene propylene, or perfluoroalkoxy alkanes), copolymers with a polyamide (e.g., Nylon-6,6' or Nylon-6), a copolymer with a polyimide, a copolymer with a high-performance plastic (e.g. polyphenylene sulfide) or a combination thereof.

In certain embodiments, the shaped adsorbent material as described herein is produced from the binder crosslinking of a ground precursor activated carbon material, wherein the ground activated carbon material is in the form of a powder. For example, in certain embodiments, the shaped adsorbent material as described herein is produced by taking a powdered activated carbon material and applying the crosslinking binder technology of U.S. Pat. No. 6,472,343.

Different types of shaped carbon bodies have been demonstrated with this inventive polymeric binder technology. These include (but are not limited to) granules, cylindrical pellets, spheres, sheets, ribbons, trilobes, and honeycombs. In principle, any desired shape of carbon body can be formed with a proper shaping device. So, shapes such as monoliths, blocks, and other modular forms are envisioned as well. This binder technology is applicable to virtually all varieties of activated carbons, including those made from different precursor materials such as wood, coal, coconut, nutshell, and olive pit prepared by acid, alkali, or thermal activation.

Alternatively, or in combination, an inorganic binder may be used. The inorganic binder may be a clay or a silicate material. For example, the binder of the low retentivity particulate adsorbent may be at least one of Zeolite clay, Bentonite clay, Montmorillonite clay, Illite clay, French Green clay, Pascalite clay, Redmond clay, Terramin clay, Living clay, Fuller's Earth clay, Ormalite clay, Vitallite clay, Rectorite clay, Cordierite, ball clay, kaolin or a combination thereof.

The binder as described herein for use in combination with the powdered activated carbon material can work with a variety of mixing, shaping and heat treating equipment. Different mixing devices such as low shear mullers, medium shear paddle mixers and high shear pin mixers have been demonstrated to produce a material that is suitable for subsequent shaping. Shaping devices such as auger extruders, ram extruders, granulators, roller pelletizers, spheronizers, and tableting presses are suitable, depending on the applications. Drying and curing of the wet carbon bodies can be carried out at temperatures below 270° C. with a variety of different devices, such as a convection tray oven, a vibrating fluid bed dryer, and a rotary kiln. In contrast, higher temperatures of about 500-1000° C. can be used for thermal treatment of clay-bound and phenolic resin-bound carbons, usually using a rotary kiln.

In any of the embodiments described herein, the form of adsorbent material is selected from the group consisting of granular, pellet, spherical, pelletized cylindrical, particulate media of uniform shape, particulate media of non-uniform shape, structured media of extruded form, structured media of poured form, hollow-cylinder, star, twisted spiral, asterisk, configured ribbons, and combinations thereof.

In certain additional embodiments, the adsorbent material is formed into a structure comprising a matrix with approximately uniform cell or geometric structure, e.g., a honeycomb configuration, which permits or facilitates approximately uniform air or vapor flow distribution through the subsequent adsorbent volume. In further embodiments, the adsorbent material is formed into a structure that includes a combination of any of the foregoing.

The adsorbent material may include any one or more of the above features, which can be combined in any number of ways according to the present description, and are expressly contemplated herein.

In another aspect, the description provides a method for making a shaped adsorbent material and/or a shaped adsorbent material produced according to the steps comprising: (a) providing an activated adsorbent precursor, e.g., an activated carbon precursor as described herein such as activated carbon; (b) grinding the activated adsorbent precursor to a powder, wherein the powder has a pBACT of at least about 50 g/100 g; (c) admixing the powder with a binder material; and (d) shaping the powder and binder material admixture into a form, wherein the shaped adsorbent material has an ASTM BWC as described herein, e.g., at least 13 g/dL. In certain embodiments, the shaping step is performed by extruding the admixture of step (c). In certain embodiments, the extrusion is performed at a relative humidity of from about 50% to about 75%, or from about 50% to about 65%.

In certain embodiments, the pBACT of the activated adsorbent powder, e.g., activated carbon powder, is from about 50 g/100 g to about 95 g/100 g, from about 50 g/100 g to about 90 g/100 g, from about 50 g/100 g to about 85 g/100 g, from about 50 g/100 g to about 80 g/100 g, from about 50 g/100 g to about 75 g/100 g, from about 50 g/100 g to about 70 g/100 g, from about 50 g/100 g to about 65 g/100 g, about 50 g/100 g to about 60 g/100 g, and including all overlapping ranges, subsumed ranges and values in between.

In certain embodiments, the shaped adsorbent has an ASTM BWC that is greater than about 13 g/dL, or 14 g/dL, or 15 g/dL, or 16 g/dL, or 17 g/dL, or 18 g/dL, or 19 g/dL, or 20 g/dL, or 21 g/dL, or 22 g/dL, or 23 g/dL, or 24 g/dL, or 25 g/dL, or more than 25 g/dL, or from about 13 g/dL to about 40 g/dL, or from about 13 g/dL to about 30 g/dL, or from about 13 g/dL to about 20 g/dL, and including all overlapping ranges, subsumed ranges and values in between.

In certain embodiments, the method comprises an additional step of drying the shaped adsorbent material. In certain embodiments, the method includes tumbling the shaped adsorbent material. In certain embodiments, the tumbling step is performed prior to drying. In certain embodiments, the tumbling step is performed subsequent to drying. In certain embodiments, the tumbling step is performed for at least 3, 4, 5, 6, 7, 8, 9, 10, 11, 12, 13, 14, 15, 16, 17, 18, 19, 20 minutes or more. Without being bound by any particular theory, it is hypothesized that tumbling dimples the material and increases the density.

In certain embodiments, the shaped adsorbent material further has at least one of: (i) a ratio of pore volumes of 0.05-1 micron to 0.05-100 microns that is as described herein, e.g., greater than about 80%, (ii) a ratio of pore volumes of 0.05-0.5 micron to 0.05-100 microns that is as described herein, e.g., greater than about 50%, or (iii) a combination thereof. In certain embodiments, the shaping step is performed by extrusion.

In certain additional embodiments, the method includes step (e) of drying, curing or calcining the shaped adsorbent material. In certain embodiments the drying, curing or calcining step is performed for from about 30 minutes to about 20 hours. In certain embodiments, the drying curing or calcining step is performed for about 1, about 2, about 3, about 4, about 5, about 6, about 7, about 8, about 9, about 10, about 11, about 12, about 13, about 14, about 15, about 16, about 17, about 18, about 19, or about 20 hours, including all values in between. In certain embodiments, the drying, curing or calcining step is performed at a temperature ranging from about 100° C. to about 650° C. In certain embodiments, the drying, curing or calcining step is performed at a temperature of about 100° C., about 110° C., about 120° C., about 130° C., about 140° C., about 150° C., about 160° C., about 170° C., about 180° C., about 190° C., about 200° C., about 250° C., about 300° C., about 350° C., about 400° C., about 450° C., about 500° C., about 550° C., about 600° C., about 650° C., about 700° C., or about 750° C., or about 800° C., or about 850° C., or about 900° C., or about 950° C., or about 1000° C., or about 1050° C., or about 1100° C.

In any of the aspects or embodiments described herein the activated adsorbent powder, e.g., activated carbon powder, is included in an amount of from 75 wt % to about 99 wt %, or from 80 wt % to about 99 wt %, including all ranges overlapping or subsumed, and all values in between. In any of the aspects or embodiments described herein the activated adsorbent powder, e.g., activated carbon powder, is included in an amount of about 75 wt %, about 76 wt %, about 77 wt %, about 78 wt %, about 79 wt %, about 80 wt %, about 81 wt %, about 82 wt %, about 83 wt %, about 84 wt %, about 85 wt %, about 86 wt %, about 87 wt %, about 88 wt %, about 89 wt %, about 90 wt %, about 91 wt %, about 92 wt %, about 93 wt %, about 94 wt %, about 95 wt %, about 96 wt %, about 97 wt %, about 98 wt %, or about 99 wt % including all values in between.

In any of the aspects or embodiments described herein, the binder, e.g., cellulosic or clay binder, is included in an amount of from about 0.05 wt % to about 25 wt % to about 1 wt %. In any of the aspects or embodiments described herein, the binder, e.g., clay binder, is included in an amount of about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, or about 25 wt % including all values in between.

In certain embodiments, the amount of binder is less than about 8 wt %, for example from about 0.05 wt % to about 8 wt %, from about 0.1 wt % to about 8 wt %, from about 0.5 wt % to about 8 wt %, from about 1.0 wt % to about 8 wt %, from about 1.5 wt % to about 8 wt %, from about 2.0 wt % to about 8 wt %, from about 2.5 wt % to about 8 wt %, from about 3.0 wt % to about 8 wt %, from about 3.5 wt % to about 8 wt %, or from about 4.0 wt % to about 8 wt % including all values in between. In certain embodiments, the binder is CMC and is present in an amount of less than about 8 wt %, for example from about 0.05 wt % to about 8 wt %, from about 0.1 wt % to about 8 wt %, from about 0.5 wt % to about 8 wt %, from about 1.0 wt % to about 8 wt %, from about 1.5 wt % to about 8 wt %, from about 2.0 wt % to about 8 wt %, from about 2.5 wt % to about 8 wt %, from about 3.0 wt % to about 8 wt %, from about 3.5 wt % to about 8 wt %, or from about 4.0 wt % to about 8 wt %, including all values in between. It was observed that at the claimed amount of binder, the resulting shaped adsorbents provided surprisingly and unexpectedly advantageous BWC as well as relatively low DBL.

In certain embodiments, the amount of binder is from about 10 wt % to about 35 wt %, for example from about 10 wt % to about 30 wt %, from about 10 wt % to about 25 wt %, from about 10 wt % to about 20 wt %, or from about 10 wt % to about 15 wt %, including all values in between. In certain embodiments, the binder is bentonite clay and is present in an amount of from about 10 wt % to about 35 wt %, for example from about 10 wt % to about 30 wt %, from about 10 wt % to about 25 wt %, from about 10 wt % to about 20 wt %, or from about 10 wt % to about 15 wt %, including all values in between. It was observed that at the claimed amount of binder, the resulting shaped adsorbents provided surprisingly and unexpectedly advantageous BWC as well as relatively low DBL.

In certain embodiments, the shaped adsorbent material has a ratio of pore volumes of 0.05-1 micron to 0.05-100 micron of greater than about 80%, greater than about 90% or more. In additional embodiments, the shaped adsorbent has a ratio of pore volumes of 0.05-0.5 micron to 0.05-100 microns of greater than about 50%, greater than about 60%, greater than about 70%, greater than about 80%, or greater than about 90%. In additional embodiments, the shaped adsorbent has an ASTM BWC that is greater than about 13 g/dL, or 14 g/dL, or 15 g/dL, or 16 g/dL, or 17 g/dL, or 18 g/dL, or 19 g/dL, or 20 g/dL, or 21 g/dL, or 22 g/dL, or 23 g/dL, or 24 g/dL, or 25 g/dL, or more than 25 g/dL, or from about 13 g/dL to about 40 g/dL, or from about 13 g/dL to about 30 g/dL, or from about 13 g/dL to about 20 g/dL, and including all overlapping ranges, subsumed ranges and values in between. In certain embodiments, the activated adsorbent precursor is an activated carbon precursor. In certain embodiments, the binder material is as described herein. In another embodiment, the shaped adsorbent is in any form described herein.

In certain embodiments, when the shaped adsorbent material as described herein is the fill in a 2.1 liter test canister having the dimensions as described herein (i.e., the "Defined Canister"), the Defined Canister demonstrates two-day DBL bleed emissions performance (second day diurnal breathing loss (DBL) emissions) of about 100 mg or less, about 90 mg or less, about 80 mg or less, about 70 mg or less, about 60 mg or less, about 50 mg or less, about 40 mg or less, about 30 mg or less, about 20 mg or less, or about 10 mg or less with 315 liters (i.e., 150 BV) of purge applied after a 40 g/hr butane loading step as determined by the 2012 BETP. In certain embodiments, when the shaped adsorbent material as described herein is the fill in the Defined Canister, the Defined Canister demonstrates two-day DBL bleed emissions performance of from about 10 mg to about 100 mg, from about 10 mg to about 90 mg, from about 10 mg to about 80 mg, from about 10 mg to about 70 mg, from about 10 mg to about 60 mg, from about 10 mg to about 50 mg, from about 10 mg to about 40 mg, from about 10 mg to about 30 mg, from about 10 mg to about 20 mg, from about 15 mg to about 100 mg, from about 15 mg to about 90 mg, from about 15 mg to about 80 mg, from about 15 mg to about 70 mg, from about 15 mg to about 60 mg, from about 15 mg to about 50 mg, from about 15 mg to about 40 mg, from about 15 mg to about 30 mg, from about 15 mg to about 20 mg, from about 20 mg to about 100 mg, from about 20 mg to about 90 mg, from about 20 mg to about 80 mg, from about 20 mg to about 70 mg, from about 20 mg to about 60 mg, from about 20 mg to about 50 mg, from about 20 mg to about 40 mg, from about 20 mg to about 30 mg, from about 30 mg to about 100 mg, from about 30 mg to about 90 mg, from about 30 mg to about 80 mg, from about 30 mg to about 70 mg, from about 30 mg to about 60 mg, from about 30 mg to about 50 mg, from about 30 mg to about 40 mg, from about 40 mg to about 100 mg, from about 40 mg to about 90 mg, from about 40 mg to about 80 mg, from about 40 mg to about 70 mg, from about 40 mg to about 60 mg, from about 40 mg to about 50 mg, from about 50 mg to about 100 mg, from about 50 mg to about 90 mg, from about 50 mg to about 80 mg, from about 50 mg to about 70 mg, from about 50 mg to about 60 mg, from about 60 mg to about 100 mg, from about 60 mg to about 90 mg, from about 60 mg to about 80 mg, from about 60 mg to about 70 mg, from about 70 mg to about 100 mg, from about 70 mg to about 90 mg, from about 70 mg to about 80 mg, from about 80 mg to about 100 mg, from about 80 mg to about 90 mg, or from about 90 mg to about 100 mg, including all values and ranges overlapping, subsumed, and in between with 315 liters (i.e., 150 BV) of purge applied after a 40 g/hr butane loading step as determined by the 2012 BETP.

In certain embodiments, the shaped adsorbent as tested as the volume fill in a 2.1 liter canister as described herein (i.e., the "Defined Canister") has a two-day diurnal breathing loss (DBL) emissions of no more than 100 mg at 150 bed volumes (BV) of purge applied after the 40 g/hr butane loading step, as determined by the 2012 California Bleed Emissions Test Procedure (BETP), or a DBL of no more than 90 mg at 150 bed volumes of purge applied after the 40 g/hr butane loading step, as determined by the 2012 BETP, or a DBL of no more than 80 mg at 150 bed volumes of purge applied after the 40 g/hr butane loading step, as determined by the 2012 BETP, or a DBL of no more than 70 mg at 150 bed volumes of purge applied after the 40 g/hr butane loading step, as determined by the 2012 BETP, or a DBL of no more than 60 mg at 150 bed volumes of purge applied after the 40 g/hr butane loading step, as determined by the 2012 BETP, or a DBL of no more than 50 mg at 150 bed volumes of purge applied after the 40 g/hr butane loading step, as determined by the 2012 BETP, or a DBL of no more than 40 mg at 150 bed volumes of purge applied after the 40 g/hr butane loading step, as determined by the 2012 BETP, or a DBL of no more than 30 mg at 150 bed volumes of purge applied after the 40 g/hr butane loading step, as determined by the 2012 BETP, or a DBL of no more than 20 mg at 150 bed volumes of purge applied after the 40 g/hr butane loading step, as determined by the 2012 BETP, including all values in between.

In certain additional embodiments, a canister comprising the shaped adsorbent as described herein as tested as the volume fill in a 2.1 liter canister as described herein (i.e., the "Defined Canister") has an two-day DBL at 315 L or 150 BV of purge applied after the 40 g/hr butane loading step, as determined by the 2012 BETP that is reduced by about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or more as compared to the precursor activated adsorbent material.

In certain additional embodiments, a canister comprising the shaped adsorbent as described herein as tested as the volume fill in a 2.1 liter canister as described herein (i.e., the "Defined Canister") has an two-day DBL at 315 L or 150 BV of purge applied after the 40 g/hr butane loading step, as determined by the 2012 BETP that is reduced by from about 10% to about 95%, from about 10% to about 90%, from about 10% to about 85%, from about 10% to about 80%, from about 10% to about 75%, from about 10% to about 70%, from about 10% to about 65%, from about 10% to about 60%, from about 10% to about 55%, from about 10% to about 50%, from about 10% to about 45%, from about 10% to about 40%, from about 10% to about 35%, from about 10% to about 30%, from about 10% to about 25%, from about 10% to about 20%, from about 10% to about 15%, from about 20% to about 95%, from about 20% to about 90%, from about 20% to about 85%, from about 20% to about 80%, from about 20% to about 75%, from about 20% to about 70%, from about 20% to about 65%, from about 20% to about 60%, from about 20% to about 55%, from about 20% to about 50%, from about 20% to about 45%, from about 20% to about 40%, from about 20% to about 35%, from about 20% to about 30%, from about 20% to about 25%, from about 30% to about 95%, from about 30% to about 90%, from about 30% to about 85%, from about 30% to about 80%, from about 30% to about 75%, from about 30% to about 70%, from about 30% to about 65%, from about 30% to about 60%, from about 30% to about 55%, from about 30% to about 50%, from about 30% to about 45%, from about 30% to about 40%, from about 30% to about 35%, from about 40% to about 95%, from about 40% to about 90%, from about 40% to about 85%, from about 40% to about 80%, from about 40% to about 75%, from about 40% to about 70%, from about 40% to about 65%, from about 40% to about 60%, from about 40% to about 55%, from about 40% to about 50%, from about 40% to about 45%, from about 50% to about 95%, from about 50% to about 90%, from about 50% to about 85%, from about 50% to about 80%, from about 50% to about 75%, from about 50% to about 70%, from about 50% to about 65%, from about 50% to about 60%, or from about 50% to about 55% as compared to the precursor activated adsorbent material, including all values and ranges overlapping, subsumed, and in between.

In another aspect, the disclosure provides an evaporative emission control canister system comprising at least one adsorbent volume including a shaped adsorbent volume as described herein. In certain embodiments, the shaped adsorbent volume comprises an admixture of a binder and an activated adsorbent powder derived by grinding an activated adsorbent precursor, wherein the admixture is shaped into a form, and wherein the shaped adsorbent material has an ASTM BWC of at least 13 g/dL. In certain embodiments, the activated adsorbent powder has as butane activity (pBACT)

of at least about 50 g/100 g. In certain embodiments, the shaped adsorbent material has at least one of: (i) a ratio of pore volumes of 0.05-1 micron to 0.05-100 microns that is greater than about 80%, (ii) a ratio of pore volumes of 0.05-0.5 micron to 0.05-100 microns that is greater than about 50%, or (iii) a combination thereof.

In certain aspects, the evaporative emission control canister system comprises at least one fuel-side adsorbent volume and at least one subsequent (i.e., vent-side) adsorbent volume, wherein at least one of the at least one fuel-side adsorbent volume or at least one subsequent adsorbent volume includes a shaped adsorbent material as described herein.

In any of the aspects or embodiments described herein, the evaporative emission control canister system has a two-day diurnal breathing loss (DBL) emissions of 100 mg or less with no more than 315 liters of purge applied after a 40 g/hr butane loading step as determined by the 2012 California Bleed Emissions Test Procedure (BETP).

In certain embodiments, the evaporative emission control canister system has a two-day diurnal breathing loss (DBL) emissions of no more than about 100 mg, no more than about 95 mg, no more than about 90 mg, no more than about 85 mg, no more than about 80 mg, no more than about 75 mg, no more than about 70 mg, no more than about 65 mg, no more than about 60 mg, no more than about 55 mg, no more than about 50 mg, no more than about 45 mg, no more than about 40 mg, no more than about 35 mg, no more than about 30 mg, no more than about 25 mg, no more than about 20 mg, no more than about 15 mg or no more than about 10 mg at no more than about 315 liters, no more than about 310 liters, no more than about 300 liters, no more than about 290 liters, no more than about 280 liters, no more than about 270 liters, no more than about 260 liters, no more than about 250 liters, no more than about 240 liters, no more than about 230 liters, no more than about 220 liters, no more than about 210 liters, no more than about 200 liters, no more than about 190 liters, no more than about 180 liters, no more than about 170 liters, no more than about 160 liters, no more than about 150 liters, no more than about 140 liters, no more than about 130 liters, no more than about 120 liters, no more than about 110 liters, no more than about 100 liters, no more than about 90 liters, or no more than about 80 liters of purge applied after a 40 g/hr butane loading step as determined by the 2012 California Bleed Emissions Test. In certain embodiments, the amount of purge volume providing the above two-day DBL emissions as determined by the 2012 BETP is from about 50 liters to about 315 liters, from about 75 liters to about 315 liters, from about 100 liters to about 315 liters, from about 125 liters to about 315 liters, from about 150 liters to about 315 liters, from about 175 liters to about 315 liters, from about 200 liters to about 315 liters, from about 210 liters to about 315 liters, from about 220 liters to about 315 liters, from about 230 liters to about 315 liters, from about 240 liters to about 315 liters, or from about 250 liters to about 315 liters, including all values and ranges overlapping, subsumed, and in between.

In certain embodiments, the evaporative emission control canister system has a two-day diurnal breathing loss (DBL) emissions of no more than about 100 mg, no more than about 95 mg, no more than about 90 mg, no more than about 85 mg, no more than about 80 mg, no more than about 75 mg, no more than about 70 mg, no more than about 65 mg, no more than about 60 mg, no more than about 55 mg, no more than about 50 mg, no more than about 45 mg, no more than about 40 mg, no more than about 35 mg, no more than about 30 mg, no more than about 25 mg, no more than about 20 mg, no more than about 15 mg or no more than about 10 mg at no more at no more than about 150 BV, no more than about 145 BV, no more than about 140 BV, no more than about 135 BV, no more than about 130 BV, no more than about 125 BV, no more than about 120 BV, no more than about 115 BV, no more than about 110 BV, no more than about 105 BV, no more than about 100 BV, no more than about 95 BV, no more than about 90 BV, no more than about 85 BV, no more than about 80 BV, no more than about 75 BV, no more than about 70 BV, no more than about 65 BV, no more than about 60 BV, no more than about 55 BV, no more than about 50 BV, no more than about 45 BV, or no more than about 40 BV of purge applied after a 40 g/hr butane loading step as determined by the 2012 California Bleed Emissions Test.

In any of the aspects or embodiments described herein, the evaporative emission control canister system has a two-day diurnal breathing loss (DBL) emissions of less than 100 mg when tested by the China 6 Type Test Procedure as described herein.

The term "fuel-side adsorbent volume" is used in reference to a volume of adsorbent material that is proximal to the fuel vapor source, and therefore, earlier in the fuel vapor flow path relative to a subsequent adsorbent volume, which is necessarily positioned closer to the vent port (herein, a "vent-side adsorbent volume"). As the skilled artisan would appreciate, during a purge cycle, a vent-side or subsequent adsorbent volume(s) is contacted earlier in the purge air flow path. For convenience, the fuel-side adsorbent may be referred to as the "initial adsorbent volume" because it is positioned upstream in the fuel vapor flow path relative to the vent-side or subsequent adsorbent volume but the initial adsorbent volume is not necessarily required to be the first adsorbent volume in the canister.

Figure 2:
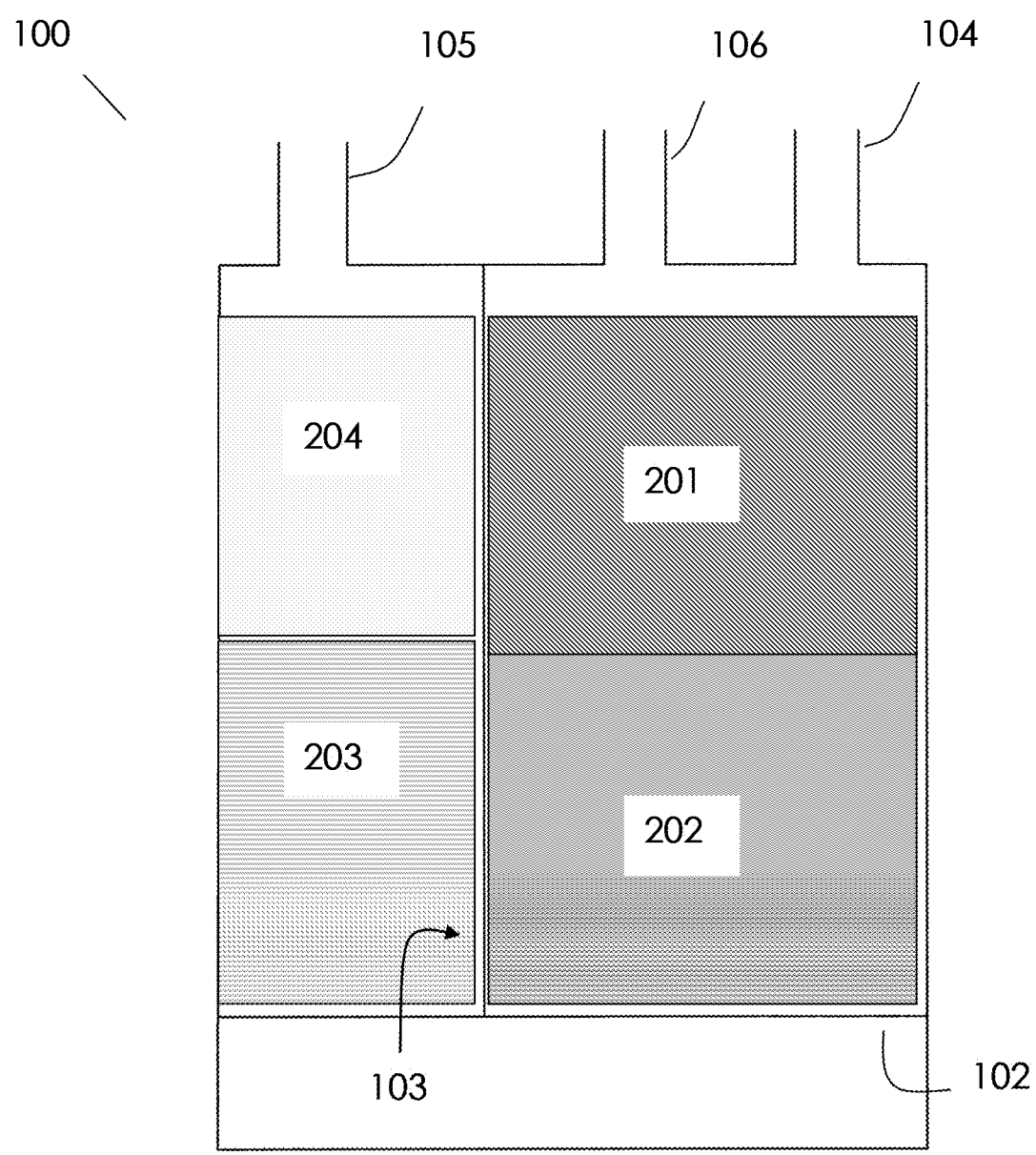
FIG. 2 is a cross-sectional views of evaporative emission control canister systems with many possible combinations of where the inventive embodiments of the adsorbent may be utilized.

FIG. 1 illustrates one embodiment of the evaporative emission control canister system 100 having an adsorbent volumes in-series within a single canister. Canister system 100 includes a support screen 102, a dividing wall 103, a fuel vapor inlet 104 from a fuel tank, a vent port 105 opening to an atmosphere, a purge outlet 106 to an engine, the fuel-side or initial adsorbent volume 201, and vent-side or subsequent adsorbent volume 202. When an engine is off, the fuel vapor from a fuel tank enters the canister system 100 through the fuel vapor inlet 104. The fuel vapor diffuses or flows into the fuel-side or initial adsorbent volume 201, and then the vent-side or subsequent adsorbent volume 202, which together define an air and vapor flow path, before being released to the atmosphere through the vent port 105 of the canister system. Once the engine is turned on, ambient air is drawn into the canister system 100 through the vent port 105. The purge air flows through volumes 202 in the canister 101, and finally through the fuel-side or initial adsorbent volume 201. This purge flow desorbs the fuel vapor adsorbed on the adsorbent volumes 201 through 202, before entering an internal combustion engine through the purge outlet 106. In any of the embodiments of the evaporative emission control canister system described herein, the canister system may include more than one vent-side or subsequent adsorbent volume. For example, the vent-side adsorbent volume 201 may have an additional or a plurality of vent-side adsorbent volumes 202 before the support screen 102, as shown in FIG. 2. Additional vent-side adsorbent volumes 203 and 204 may be found on the other side of the dividing wall.

Figure 3:
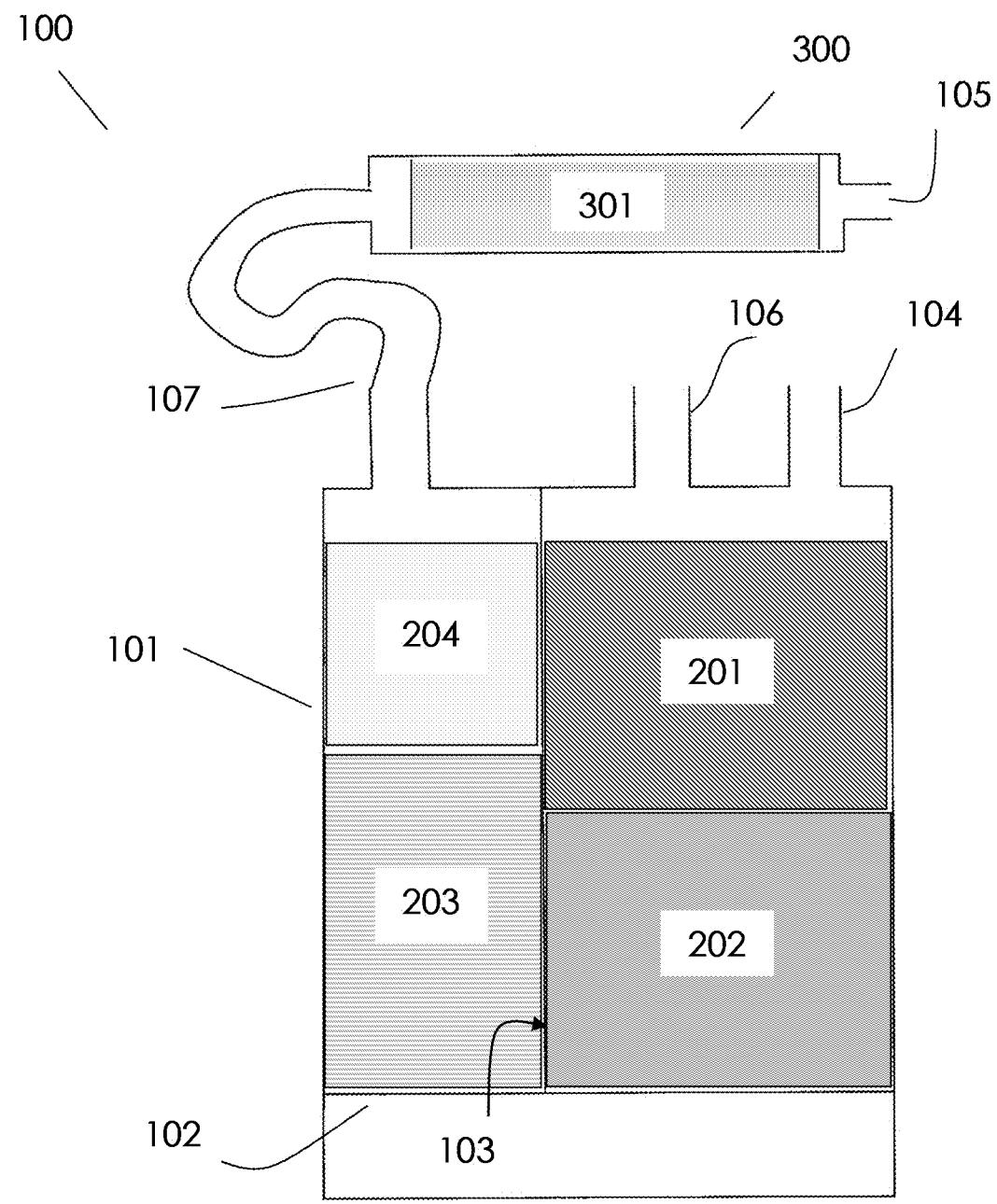
FIG. 3 is a cross-sectional views of evaporative emission control canister systems with many possible combinations of where the inventive embodiments of the adsorbent may be utilized.
Figure 4:
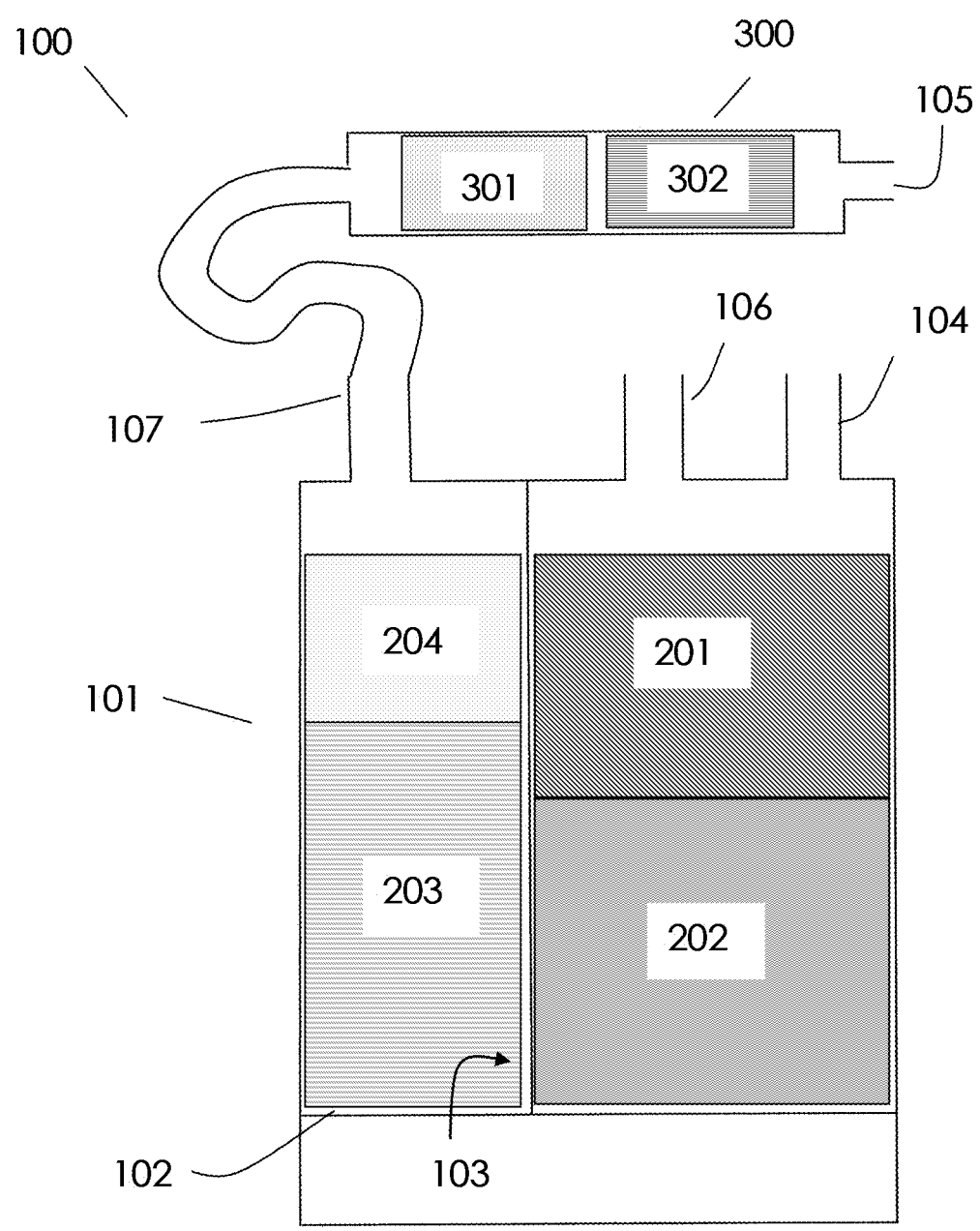
FIG. 4 is a cross-sectional views of evaporative emission control canister systems with many possible combinations of where the inventive embodiments of the adsorbent may be utilized.

Furthermore, in still additional embodiments, the canister system may include more than one type of vent-side adsorbent volume, which can be independently selected, and/or which is comprised in one or more containers. For example, as shown in FIG. 3, an auxiliary chamber 300 containing a vent-side adsorbent volume 301 may be in-series in terms of air and vapor flow with the main canister 101 containing multiple adsorbent volumes. As shown in FIG. 4, the auxiliary chamber 300 may contain two vent-side adsorbent volumes in-series 301 and 302. The adsorbent volumes 301 and 302 may also be contained within in-series chambers or auxiliary canisters, rather than the single chamber 300 of FIG. 4.

In any of the embodiments described herein, the evaporative emission control system may further comprise a heating unit or a means to add heat through electrical resistance or heat conduction.

In any of the aspects or embodiments described herein, the canister system comprises one or more vent-side adsorbent volumes having a uniform cell structure at or near the end of the fuel vapor flow path.

In certain embodiments, the at least one fuel-side or initial adsorbent volume and the at least one vent-side or subsequent adsorbent volume (or volumes) are in vaporous or gaseous communication and define an air and vapor flow path therethrough. The air and vapor flow path permits or facilitates directional air or vapor flow or diffusion between the respective adsorbent volumes in the canister system. For example, the air and vapor flow path facilitates the flow or diffusion of fuel vapor from the at least one fuel-side or initial adsorbent volume to the at least one vent-side or subsequent adsorbent volume (or volumes).

In any of the embodiments described herein, the at least one fuel-side or initial adsorbent volume and the at least one vent-side or subsequent adsorbent volume(s) may be located within a single canister, separate canisters or a combination of both. For example, in certain embodiments, the system comprises a canister comprising a fuel-side or initial adsorbent volume, and one or more vent-side or subsequent adsorbent volumes, wherein the vent-side or subsequent adsorbent volumes are connected to the fuel-side initial adsorbent volume such that they are in vaporous or gaseous communication forming a vapor flow path, and allowing air and/or vapor to flow or diffuse therethrough. In certain aspects, the canister permits sequential contact of the adsorbent volumes by air or fuel vapor.

In additional embodiments, the system comprises a canister comprising an initial adsorbent volume, and one or more subsequent adsorbent volumes connected to one or more separate canisters comprising at least one additional subsequent adsorbent volume, wherein the subsequent adsorbent volumes are connected to the initial adsorbent volume such that they are in vaporous or gaseous communication forming a vapor flow path, and allowing air and/or fuel vapor to flow or diffuse therethrough.

In certain embodiments, the system comprises a canister comprising a fuel-side or an initial adsorbent volume, and one or more vent-side or subsequent adsorbent volumes connected to one or more separate canisters comprising at least one additional subsequent adsorbent volume, wherein the one or more vent-side adsorbent volume and the at least one additional subsequent adsorbent volume are connected to the initial adsorbent volume such that they are in vaporous or gaseous communication forming a vapor flow path, and allowing air and/or fuel vapor to flow or diffuse therethrough, wherein at least one of the adsorbent volumes in the system is a shaped adsorbent material as described herein having an ASTM BWC of greater than 13 g/dL, and wherein the shaped adsorbent material has a ratio of pore volumes of 0.05-1 micron to 0.05-100 micron as described herein, e.g., of greater than about 80%, and wherein the canister system, when tested by BETP, has a two-day diurnal breathing loss (DBL) emissions of no more than 20 mg at 150 bed volumes of purge applied after the 40 g/hr butane loading step, as determined by the 2012 California Bleed Emissions Test Procedure (BETP), or a DBL of no more than 90 mg at 150 bed volumes of purge applied after the 40 g/hr butane loading step, as determined by the 2012 BETP, or a DBL of no more than 80 mg at 150 bed volumes of purge applied after the 40 g/hr butane loading step, as determined by the 2012 BETP, or a DBL of no more than 70 mg at 150 bed volumes of purge applied after the 40 g/hr butane loading step, as determined by the 2012 BETP, or a DBL of no more than 60 mg at 150 bed volumes of purge applied after the 40 g/hr butane loading step, as determined by the 2012 BETP, or a DBL of no more than 50 mg at 150 bed volumes of purge applied after the 40 g/hr butane loading step, as determined by the 2012 BETP, including all values in between.

In certain embodiments, the system comprises a canister comprising a fuel-side or initial adsorbent volume, and one or more vent-side or subsequent adsorbent volumes connected to one or more separate canisters comprising at least one additional subsequent adsorbent volume, wherein the one or more vent-side adsorbent volume and the at least one additional subsequent adsorbent volume connected to the fuel-side initial adsorbent volume such that they are in vaporous or gaseous communication forming a vapor flow path, and allowing air and/or fuel vapor to flow or diffuse therethrough, wherein at least one of the adsorbent volumes in the system is a shaped adsorbent as described herein having an ASTM BWC of greater than 13 g/dL, and wherein the shaped adsorbent material has a ratio of pore volumes of 0.05-1 micron to 0.05-100 micron as described herein, e.g., of greater than about 80%, and wherein the canister system, when tested according to a China 6 Type Test Procedure described herein, has a two-day diurnal breathing loss (DBL) emissions of no more than 100 mg after sequential test prep of the elevated temperature soak, the elevated temperature purge, and the 20° C. soak, or a two-day diurnal breathing loss (DBL) emissions of no more than 85 mg after sequential test prep of the elevated temperature soak, the elevated temperature purge, and the 20° C. soak, or a two-day diurnal breathing loss (DBL) emissions of no more than 70 mg after sequential test prep of the elevated temperature soak, the elevated temperature purge, and the 20° C. soak, or a two-day diurnal breathing loss (DBL) emissions of no more than 55 mg after sequential test prep of the elevated temperature soak, the elevated temperature purge, and the 20° C. soak, or a two-day diurnal breathing loss (DBL) emissions of no more than 40 mg after sequential test prep of the elevated temperature soak, the elevated temperature purge, and the 20° C. soak, including all values in between.

In any of the aspects or embodiments described herein, the fuel-side or initial adsorbent volume is the first and/or second adsorbent volume, as such, the vent-side or subsequent adsorbent volumes are those downstream in the fluid flow path towards the vent port whether in the same or a separate canister or both.

In any aspects or embodiments described herein, the canister system comprises at least one vent-side adsorbent volume having at least one of: (i) an incremental adsorption capacity at 25° C. of from 1 gram n-butane/L to less than 35 grams n-butane/L between vapor concentrations of 5 vol % and 50 vol % n-butane, (ii) an effective BWC of less than 3 g/dL, (iii) a g-total BWC of less than 6 grams, or (iv) a combination thereof. In certain embodiments, the canister comprises at least one venti-side adsorbent volume having an incremental adsorption capacity at 25° C. of about 35, about 34, about 33, about 32, about 31, about 30, about 29, about 28, about 37, about 36, about 35, about 34 about 23, about 22, about 21, about 20, about 19, about 18, about 17, about 16, about 15, about 14, about 13, about 12, about 11, about 10, about 9, about 8, about 7, about 6, about 5, about 4, about 3, about 2, or about 1 g/L between vapor concentrations of 5 vol % and 50 vol % n-butane In any of the aspects or embodiments described herein, the canister system comprises at least one fuel-side adsorbent volume having an incremental adsorption capacity at 25° C. of greater than about 35 grams n-butane per liter (g/L) to about 90 g/L between vapor concentration of 5 vol % and 50 vol % n-butane, or about 36, about 37, about 38, about 39, about 40, about 41, about 42, about 43, about 44, about 45, about 46, about 47, about 48, about 49, about 50, about 51, about 52, about 53, about 54, about 55, about 60, about 65, about 70, about 75, about 80, about 85, about 90 or more grams n-butane per liter (g/L) between vapor concentration of 5 vol % and 50 vol % n-butane. In any of the aspects or embodiments described herein, the canister system comprises at least one fuel-side adsorbent volume having an incremental adsorption capacity at 25° C. of greater than about 35, 40, 45, 50, 55, 60, 65, 70, 75, 80, 85, 90 or more grams n-butane per liter (g/L) to about 90 g/L between vapor concentration of 5 vol % and 50 vol % n-butane.

In any aspects or embodiments described herein, the canister system comprises at least one vent-side adsorbent volume having an incremental adsorption capacity at 25° C. of less than about 35 grams n-butane per liter (g/L) between vapor concentration of 5 vol % and 50 vol % n-butane, or about 34, about 33, about 32, about 31, about 30, about 19, about 18, about 17, about 16, about 15, about 14, about 13, about 12, about 11, about 10, about 9, about 8, about 7, about 6, about 5, about 4, about 3, about 2, or about 1 grams n-butane per liter (g/L) between vapor concentration of 5 vol % and 50 vol % n-butane.

EXAMPLES

Table 1 has the descriptions and properties of comparative commercial examples 1 through 8. Commercial examples of shape & activate activated carbon adsorbents include CNR 115 (Cabot Corporation, Boston, Mass.), KMAZ2 and KMAZ3 (Fujian Xinsen Carbon, Fujian Sheng, China), 3GX (Kuraray Chemical Ltd., Bizen-shi, Japan), and NUCHAR® BAX 1100 LD, BAX 1500, BAX 1500E, BAX 1700 (Ingevity Corporation, North Charleston, S.C.). All these adsorbents are in the form of cylindrical pellets of about 2-2.5 mm in diameter. Table 2 has the descriptions and properties of inventive grind & bind examples.

Examples 9 and 10 were prepared from carbon powder made from phosphoric acid-activated sawdust (NUCHAR® FP-1100 by Ingevity Corporation). This carbon powder had a powder butane activity of 42.6 g/100 g, and a mean particle diameter of 39 microns, a $d_{10\%}$ of 8 microns, $d_{50\%}$ of 35 microns, and a $d_{90\%}$ of 78 microns, as measured by a Malvern Panalytical model Mastersizer 2000 laser particle size analyzer. In the preparation of CMC-bound Example 9 carbon pellets, the dry ingredient formulation was 95.3 wt % carbon powder and 4.7 wt % CMC. For mixing and conditioning the dry mix in preparation for extrusion, a Simpson model LG mix muller (Simpson Technologies Corporation, Aurora, Ill.), where shear mixing/kneading was conducted for 35-50 minutes, with aliquots of water added for gaining the needed plasticity for extrusion. An auger extruder (The Bonnot Company, Akron, Ohio), equipped with a die plate with 2.18 mm diameter holes and a cutter blade, was used for shaping into pellets. The resulting pellets were tumbled for 4 minutes in a batch rotary pan pelletizer, dried as a static bed in a tray oven at 110° C. for about 16 hrs, and then cured as a static bed in recirculated air for 3 hrs at 150° C. In the preparation of example 10, the same process as for example 9 was used except for the following differences: 1) Instead of CMC binder, bentonite clay binder (NATIONAL® STANDARD SPCL GRIND grade from Bentonite Performance Minerals LLC) was used in a dry ingredient formulation of 81 wt % carbon and 19% clay, and 2) Instead of curing, the resulting dried pellets were calcined at 650° C. for 30 minutes in nitrogen flow in a fluidized bed in a vertical quartz tube furnace.

Example 12 was prepared the same as example 9, except that there was no curing step after tray oven drying, and the sawdust-based phosphoric acid-activated carbon powder ingredient (INGEVITY CORPORATION) had higher powder butane activity of 56.2 g/100 g, and the following particle size properties: A mean particle diameter of 40 microns, a $d_{10\%}$ of 4. microns, $d_{50\%}$ of 31 microns, and a $d_{90\%}$ of 88 microns.

Examples 11, 13, 14, and 16 were prepared with CMC binder by the following process. The activated carbon powder ingredients were phosphoric acid-activated sawdust (INGEVITY CORPORATION) of varied butane activity properties. The butane activities of the carbon powders were 59.4, 61.4, 59.8, and 64.9 g/100 g for examples 11, 13, 14, and 16, respectively. The powders had a mean particle diameter of about 40 microns, a $d_{10\%}$ of about 10 microns, $d_{50\%}$ of about 40 microns, and a $d_{90\%}$ of about 80 microns. In preparing the pellets, the carbon powder and CMC binder powder (95.3 wt % carbon powder and 4.7 wt % CMC) were blended in a plow mixer for about 20-30 minutes, with aliquots of water added for gaining the needed plasticity for extrusion. The resulting blend was processed through two successive single screw extruders with the second extruder equipped with a die plate with 2.18 mm diameter holes and a cutter blade for shaping the blend into pellets. The resulting pellets were tumbled for about 4 minutes in a continuous rotary tumbler, dried and then cured to about 130° C. in a moving bed with recirculated air for about 40 minutes.

Example 15 was prepared by the same clay-bound method as example 10, except that the ingredient activated carbon powder was made from comparative example 6 pellets (NUCHAR® BAX 1500) by preparing the powder activated carbon ingredient by grinding the example 6 pellets in a hammer mill (model WA-6-L SS by Buffalo Hammer Mill Corp., Buffalo, N.Y.) equipped with a 0.065" Φ opening screen. The resulting carbon powder used in making the example 15 pellets had the following properties: Powder butane activity of 62.2 g/100 g, and a mean particle diameter of 39 microns, a $d_{10\%}$ of 4 microns, $d_{50\%}$ of 28 microns, and a $d_{90\%}$ of 88 microns.

Figure 18:
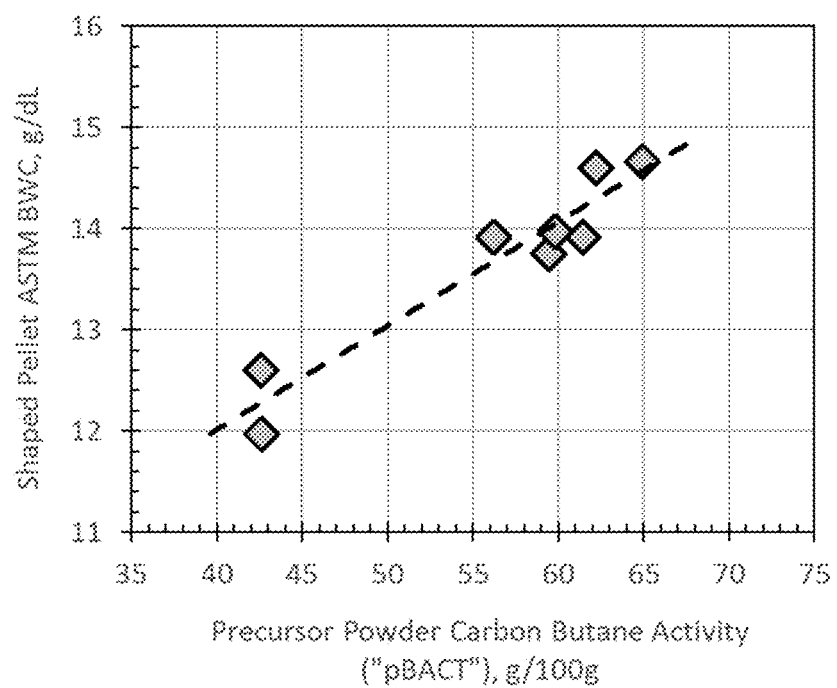
FIG. 18 shows a correlation between the butane activity of the activated carbon powder ingredients and the resulting ASTM BWC of the finished bound pellet for examples 9 through 16.

While the examples 9-16 were prepared with phosphoric acid activated carbons, the effects and benefits described herein would be obtained by binding and shaping activated carbon powder ingredient made from any carbonaceous raw material (e.g., wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, etc.) and that had its porosity generated by other chemical or thermal activation processes as long as there is sufficiently high butane activity in the carbon powder for attaining sufficiently high ASTM BWC of the final shaped adsorbent. As known in the art, within the <5 nm size pore volume that contributes to the condensed n-butane phase in the adsorbent (i.e., butane activity by the ASTM 5228 method), a preference is to have the pore distribution predominantly of the small mesopore size of 1.8-5 nm. FIG. 18 shows a good correlation between the butane activity of the activated carbon powder ingredients and the resulting ASTM BWC of the finished bound pellet for examples 9 through 16. The trend shows, for example, that activated carbon powder with a butane activity greater than 50 g/100 g is needed for a pellet with greater than 13 g/dL ASTM BWC.

Figure 5:
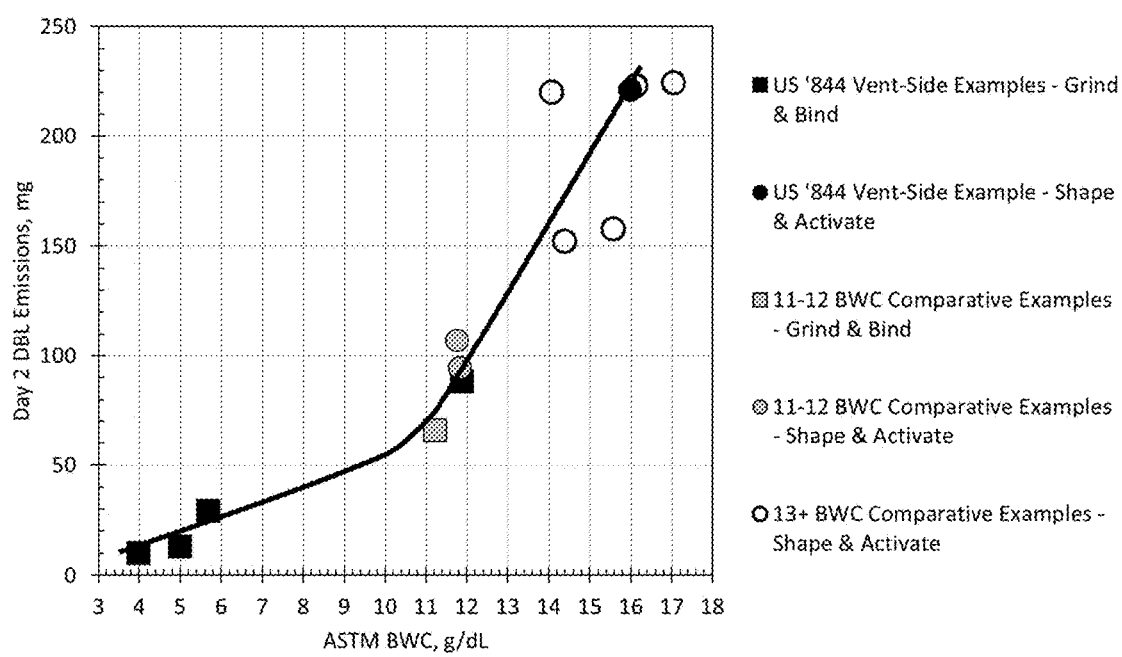
FIG. 5 are DBL emission test data by BETP for comparative examples of conventional commercial activated carbon adsorbents with a range of ASTM BWC properties.

FIG. 5 shows $2^{nd}$ day DBL emissions data by the BETP test protocol for a variety of commercial carbons of a range of ASTM BWC properties, examples 1 through 8, as tested as the volume fill in the Defined Canister system as described herein (i.e., a 2.1 L canister system—1.4 L and 0.7 L volume fills as volumes 201 and 202, respectively, of FIG. 1). The relationship shown is the state of the art for the effects of working capacity on DBL emissions, that is, a sharp increase in DBL emissions as BWC is increased beyond 12 g/dL BWC, to above 14 g/dL BWC. These high BWC examples include NUCHAR® BAX 1500, BAX 1500E, BAX 1700 (Ingevity Corporation); 3GX (Kuraray Chemical Ltd.), and KMAZ3 (Fujian Xinsen Carbon, Fujian Sheng, China); all prepared by shape & activate methods. As described in U.S. RE 38,844 ("US '844"), higher bleed emissions for higher BWC volume fills in a FIG. 1 canister system are to be expected as an inevitable result of the equilibrium adsorption properties of the adsorbent, specifically the isotherm slope and the design of the canister system with an elongated vapor flow path through the adsorbent volumes in-series. It is a dynamic where, during purge, high working capacity adsorbent towards the vent-side of the canister system, as a result of its great amount of desorbed vapors, contaminates the downstream purge flow within the canister system along the vapor flow path, thus progressively interfering with the concentration difference driving force of the purge towards the fuel vapor source. This depleted concentration driving force for desorption leaves a greater retained heel towards the fuel-source and creates the heel distribution conditions across the canister system. The heel distribution then leads to greater amounts of subsequent vapor diffusion and vapor contamination back towards the vent-side during the diurnal soak, causing a high level of emissions during the diurnal breathing event. This is the dilemma of high DBL emissions as a known characteristic high BWC adsorbents, which has appeared to be an unavoidable problem, only be addressed through the added costs, system size, and complexities of the approaches described above.

In FIG. 5, examples based on the disclosure in US '844 were tested including a 16.0 g/dL BWC pellet fill of a similar 2.1 L canister system (●). For these examples, the high BWC adsorbent in a 0.3 L vent-side volume is replaced by an adsorbent with lower ASTM BWC properties (e.g., FIG. 4 where volumes 201 and 202 are a single 1.5 L volume of 16.0 g/dL BWC carbon pellets, where volume 203 is a 0.3 L volume of 16.0 g/dL BWC carbon pellets, and where the 0.3 L vent-side volume 204 has the 16.0 g/dL BWC carbon pellets alternatively replaced by 5.0, 5.7, or 11.9 g/dL BWC adsorbent pellets). The cited BWC values for the x-axis correspond with the ASTM BWC of the 204 vent-side volume pellets. The activated carbon honeycomb example of US '844 with 4.0 g/dL BWC is also shown (■), which is a system similar to FIG. 3, consisting of the 2.1 L dual chamber canister with the 16.0 g/dL BWC pellets in volumes 201 through 204 and the carbon honeycomb contained in an auxiliary canister 300 as adsorbent fill 301. This data set from US '844 follows the same data trend of the commercial products in FIG. 5. Therefore, in effect in FIG. 5, the canister systems in US '844 with a majority content of high BWC adsorbent have the same DBL emissions as the system otherwise solely filled with the lower BWC adsorbent, albeit by the complication of replacing a portion of the high working capacity adsorbents in the main 2.1 L canister system with an alternative grade substitute adsorbent or by installing an added auxiliary chamber containing additional adsorbent.

It is significant in FIG. 5 that the comparative grind & bind 2.1 L volume fill example, the comparative shape & activate 2.1 L volume fill example, and the US '844 grind & bind vent-side replacement example, all in the 11-12 g/dL BWC range, show no effect from the method of preparation on the $2^{nd}$ day DBL emissions, which all fall within a range of about 70-90 mg. As such, the trade-off for a given main canister design is DBL emissions levels for a single type of adsorbent fill that is dependent on its level of working capacity, or an added complexity of adsorbent fill through multiple types of adsorbents in successive chambers, or in added chambers in-series.

Figure 6:
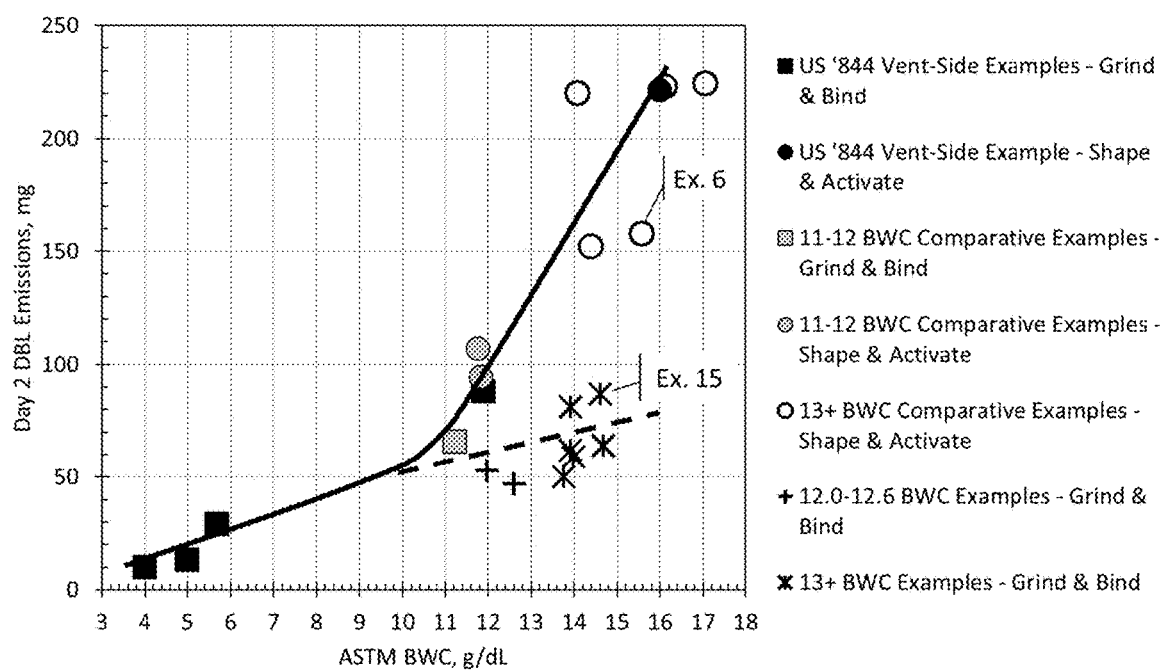
FIG. 6 are test data DBL emission test data by BETP that include inventive examples with ASTM BWC properties above 13 g/dL that were prepared by grind & bind processes.

In contrast with the comparative examples 1 through 8 in FIG. 5, examples 11 through 16 were prepared with substantially lower DBL emissions by the BETP test protocol than expected for their ASTM BWC properties of 13.7-14.7 g/dL (see FIG. 6). The DBL emissions of the examples are at a fraction of the expected amounts, e.g., 50-90 mg compared with 150-229 mg for commercial examples at comparably high BWC. The trend has 13 g/dL ASTM BWC for the inventive adsorbent at less than half the DBL emissions expected for its working capacity (60 mg vs. about 130 mg).

Two important, highlighted examples are 6 and 15. Example 15 was prepared from the comparative example 6 by the steps of grinding the BAX 1500 pellets, combining the activated carbon powder with bentonite clay and water, and shaping, drying, and, lastly, calcining in an oxygen-free atmosphere. The resulting 2 mm pellets of example 15 have a BWC of 14.6 g/dL, but the Day 2 DBL emissions are slightly lower than the 11.2 g/dL BWC pellets of Example 1.

One common feature for examples 11 through 16 with 13+ g/dL ASTM BWC is that they are prepared by "grind & bind" processing, that is combining activated carbon powder with a binder, either organic or inorganic, and forming a shaped adsorbent material as described herein. While not to be limited by theory, the potential causes for the unexpected and extremely useful DBL emissions performance advantage at these high ASTM BWC properties, above 13 g/dL, include the presence of a uniform distribution of adsorptive pores across the adsorbent its interior and the presence of a uniform internal network of pores between the powder particles for vapor transport. All conventional high working capacity products (e.g., 13+ g/dL ASTM BWC), for maximizing working capacity and minimizing the number of unit operations, are made by processes that involve shaping a carbonaceous or carbon-containing ingredient into a pellet, and then activating to form the adsorptive porosity. As shown, herein, the high BWC grind & bind adsorbents because of their surprising advantage of moderated DBL emissions have a multitude of end-use advantages for canister system design that overcome the added processing steps and despite some trade-off in ultimate working capacity potential. As a result of bonding rigid powder particles that are already activated, the grind & bind 13+ g/dL ASTM BWC adsorbents have distinctively narrow and smaller pore size or volume distributions in the macropore size range of 0.05 to 100 microns, as compared with the broader distributions, balanced between small and large size macropores, as present in conventional high BWC shape & activate adsorbents.

The surprising result of combined high working capacity with low DBL emissions for the shaped adsorbent materials as described herein is particularly unexpected because conventional high working capacity adsorbents of over 13 g/dL ASTM BWC that are exclusively made by conventional shape & activate thermal or chemical activation processes have pore volumes in the total macropore size range of 0.05-100 microns that are balanced between smaller size macropores 0.05-0.5 microns in size and larger size macropores 0.5-100 micron in size. Such a pore size distribution is taught to be favorably important for desorption and bleed emission performance for evaporative emission control adsorbents designed for higher gasoline vapor working capacity, for example with incremental adsorption capacities between 5-50% n-butane of greater than 35 g/L, which correlates to greater than about 8 g/dL ASTM BWC. See U.S. Pat. No. 9,322,368, with examples provided at about 50% of the total macropore volume in pores of 0.05-0.5 micron size, as opposed to an unfavorable comparative example with about 90% of the total macropore volume in pores of 0.05-0.5 micron size.

Figure 7:
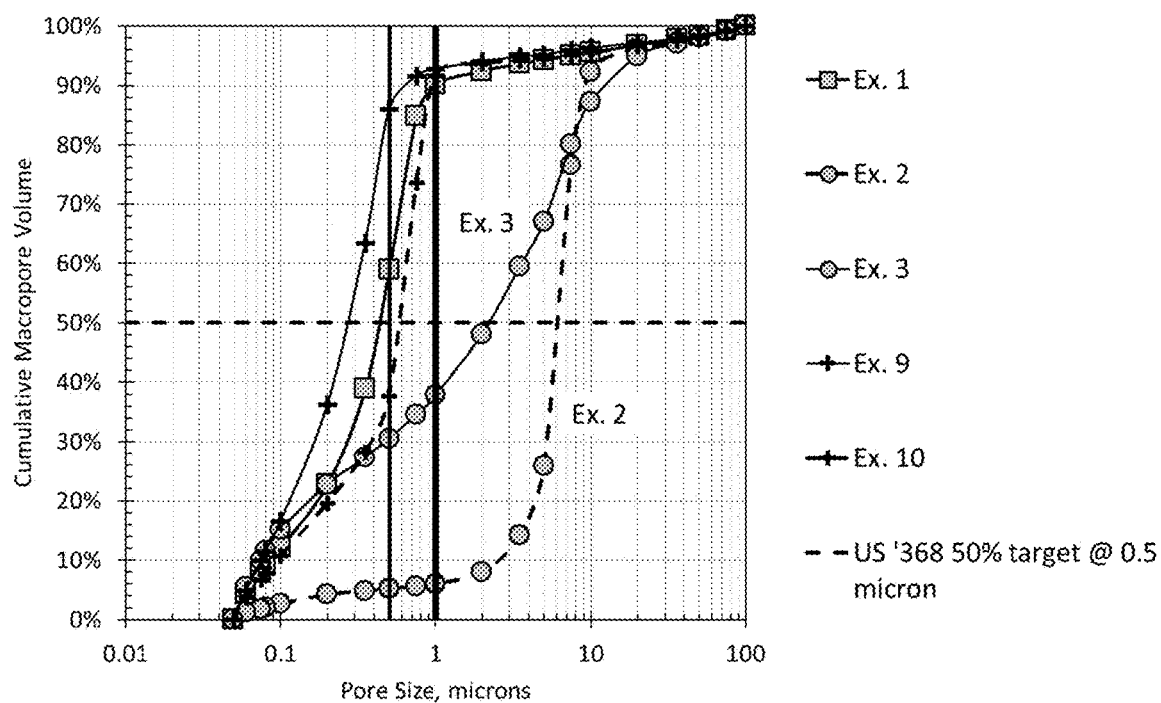
FIG. 7 are the macropore size distributions for 11-12 g/dL ASTM BWC comparative commercial examples and for 12.0-12.6 g/dL grind & bind examples 9 and 10.
Figure 8:
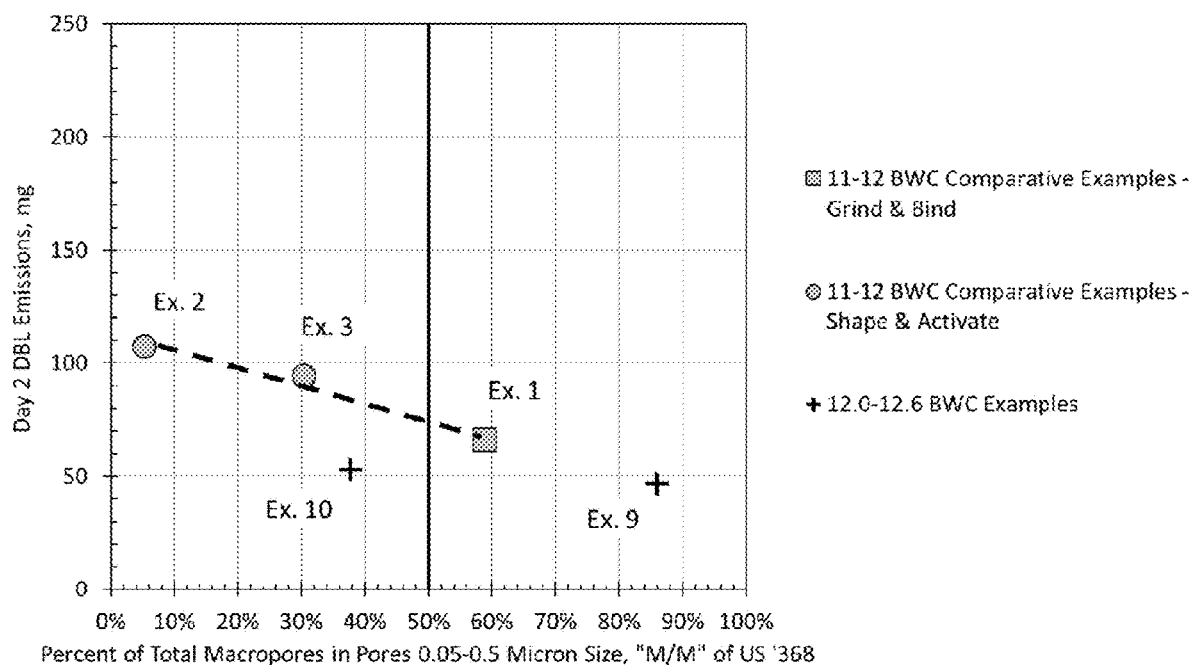
FIG. 8 shows the day 2 DBL emissions by BETP as a function of the percent of total macropores in pores 0.05-0.5 microns in size, for 11-12 g/dL ASTM BWC comparative commercial examples and for 12.0-12.6 g/dL ASTM BWC grind & bind examples 9 and 10.

For commercial adsorbents in the 11-12 g/dL ASTM BWC range where the pellets are prepared by the grind & bind method (comparative example 1) or the shape & activate (comparative examples 2 and 3) method, the macropore size distributions vary widely, from over 90% of pore volume smaller than 1 micron, to less than 10% smaller than 1 micron (see FIG. 7), with little to indicate a large potential benefit in DBL emissions for high BWC adsorbents of 13+g/dL. Two experimental grind & bind samples made with CMC or clay binder and the same powder activated carbon were prepared near this 11-12 g/dL BWC range (examples 9 and 10). As shown in FIG. 8, the differences in DBL emissions performance are not very great among the samples despite the differences in macropore distributions expressed as the function of the percentage volumes 0.05-0.5 microns. A better correlation is shown for percentage volumes 0.05-1 micron (FIG. 8). As might be expected from U.S. Pat. No. 9,322,368 ("U.S. '368"), there is an improvement in DBL emissions as the macropore distribution of the comparative commercial examples is optimized towards about 50% in 0.05-0.5 micron size pores, however, the difference is only about 40 mg between examples made by the two methods. The example 9 with its percentage of near 90% of macropore pore volume in the 0.05-0.5 micron size has the lowest DBL emissions of the group which is surprising given its pore size distribution skewed to small size macropores which were previously taught to be avoided.

Figure 9:
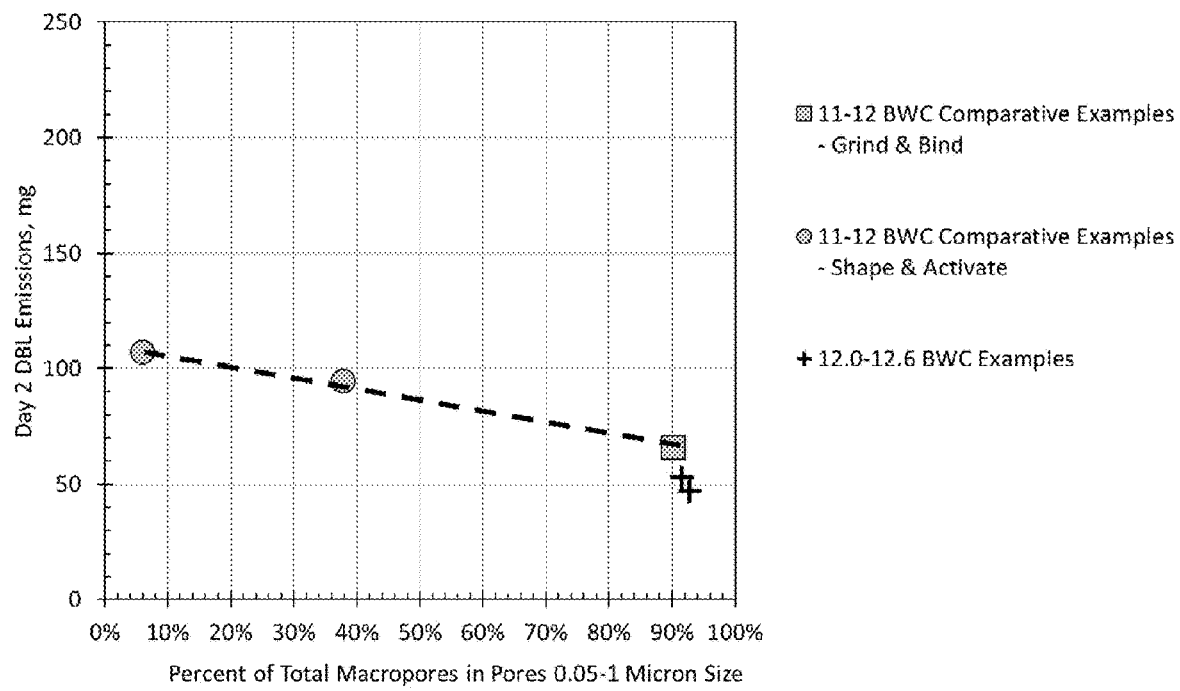
FIG. 9 shows the day 2 DBL emissions by BETP as a function of the percent of total macropores in pores 0.05-1 microns in size, for 11-12 g/dL ASTM BWC comparative commercial examples and for 12.0-12.6 g/dL grind & bind examples 9 and 10.
Figure 10:
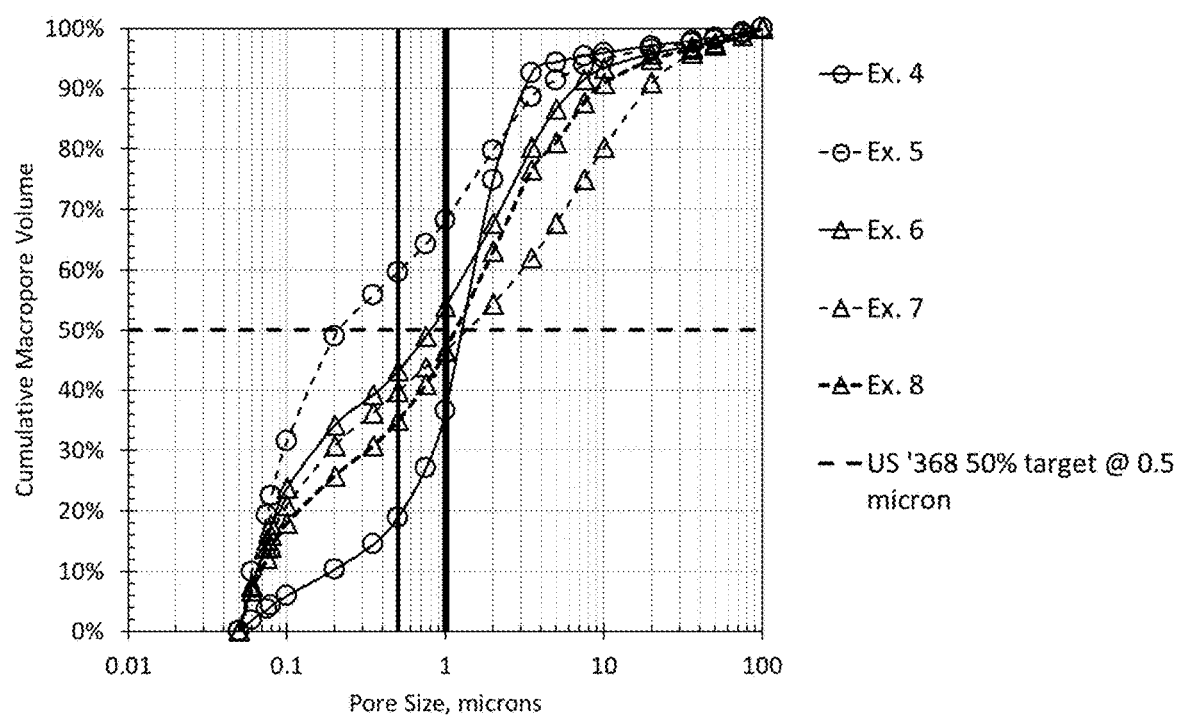
FIG. 10 are the macropore size distributions for 13+ g/dL ASTM BWC comparative commercial examples, all produced by shape & activate processes.
Figure 11:
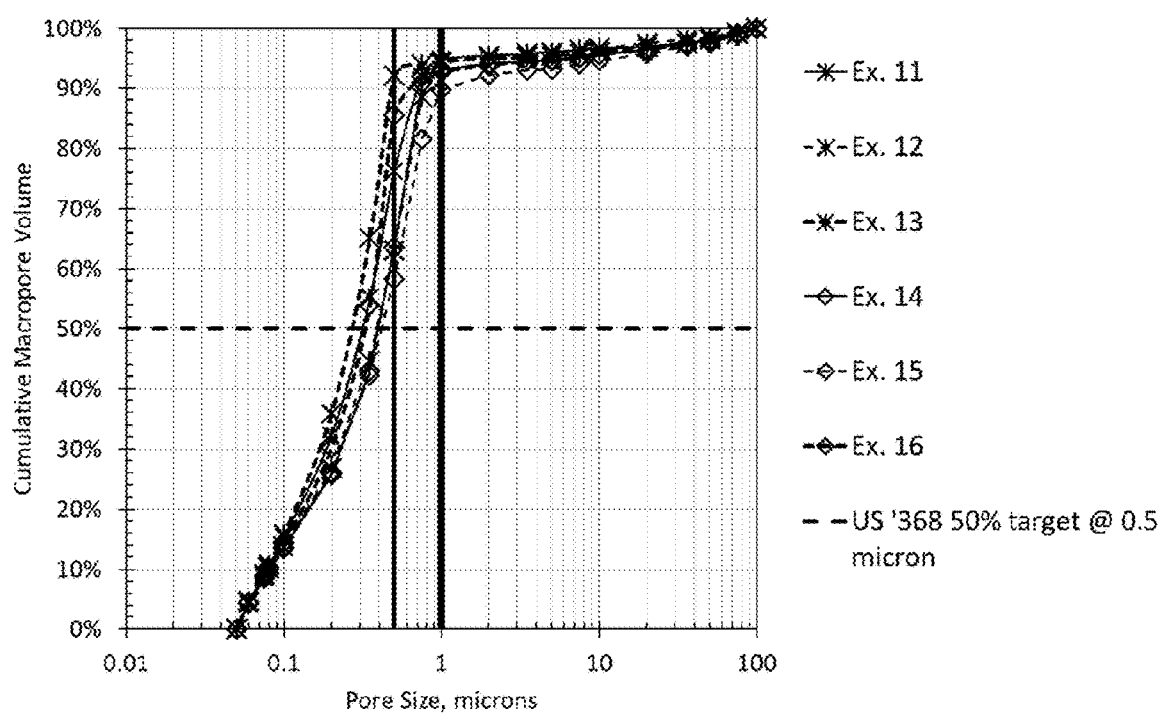
FIG. 11. are the macropore size distributions for 13+ g/dL ASTM BWC examples 11 through 16, all prepared by grind & bind processes.
Figure 12:
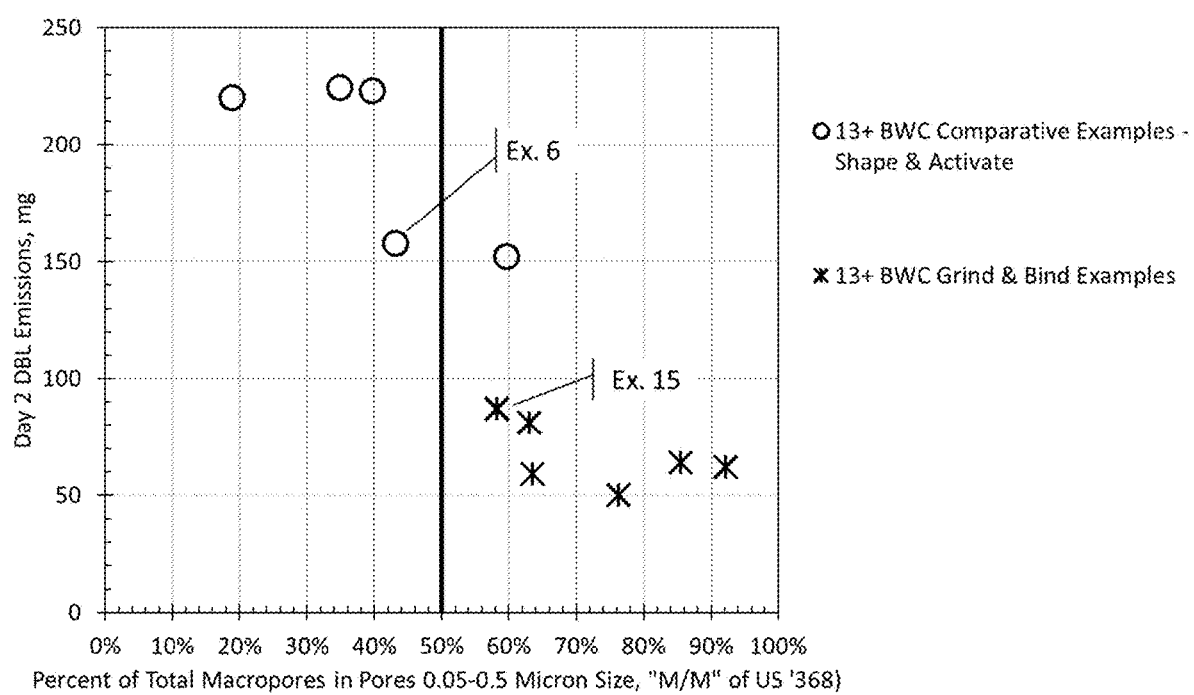
FIG. 12 shows the day 2 DBL emissions by BETP as a function of the percent of total macropores in pores 0.05-0.5 microns in size, for 13+ g/dL ASTM BWC comparative commercial examples and for 13+ g/dL grind & bind examples 11 through 16.
Figure 13:
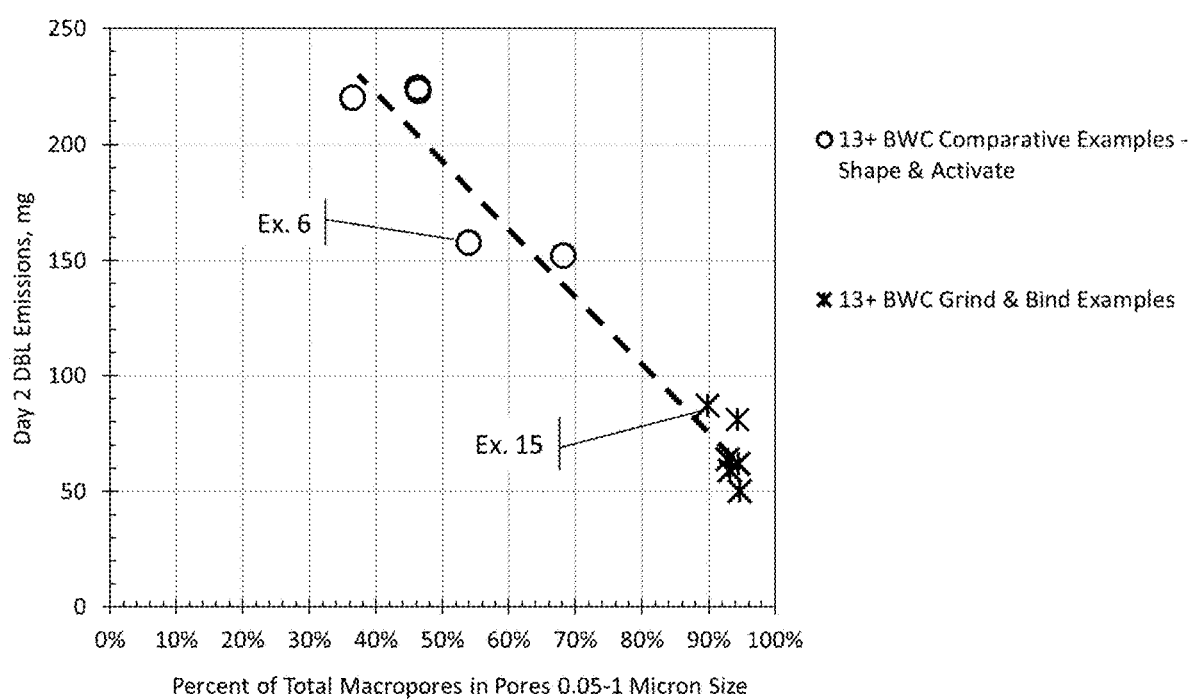
FIG. 13 shows the day 2 DBL emissions by BETP as a function of the percent of total macropores in pores 0.05-1 microns in size, for 13+ g/dL ASTM BWC comparative commercial examples and for 13+ g/dL grind & bind examples 11 through 16.

In contrast, as a consequence of maximizing working capacity by preparing the adsorbent activated carbon by shape & activate processes, perhaps due to the use of natural lignocellulosic ingredients, shaping plastic char particles, and employing activatable binders (i.e., in contrast with compacting rigid, already activated carbon powder particles with diluent binder additive), all conventional commercial activated carbons with ASTM BWCs above 13 g/dL have a broad size distribution of macropores, as shown in FIG. 10. These comparative examples 4 through 8 have only about 20-60% of total macropore volume in pores 0.05-0.5 micron in size and only about 40-70% 0.05-1 micron in size, which is consistent with a preferred macropore size distribution taught by U.S. Pat. No. 9,322,368 of about 50% of total macropore volume in pores 0.05-0.5 micron in size. The inventive grind & bind examples with ASTM BWC above 13 g/dL with substantially lower DBL emissions have macropore distributions skewed heavily to small macropores, away from the taught target and towards the smaller size distribution to be avoided (FIG. 11). For these examples 11 through 16, the proportion of total macropores that are 0.05-0.5 microns in size is 58-92% (FIG. 12) and the proportion of total macropores that are 0.05-1 micron in size is 90%, or more (FIG. 13). As with the examples 9 and 10 at 12.0-12.6 g/dL ASTM BWC and the comparative examples 11-12 g/dL ASTM BWC in FIG. 9, the comparative examples and grind & bind examples 11-16 at 13+ g/dL BWC show a good correlation of bleed emissions with the percent of total macropore volume in pores 0.05-1 micron in size, however, the effect is surprisingly stronger for the higher BWC materials (see FIG. 13). For example, comparative example 6 has about half of its total macropore volume in pores 0.05-1 microns and its bleed emission were reduced by about 100 mg by reconstituting this pellet formed by a shape & activate process into the grind & bind pellet of Example 15 which has 90% of its macropores in that size range.

Figure 14:
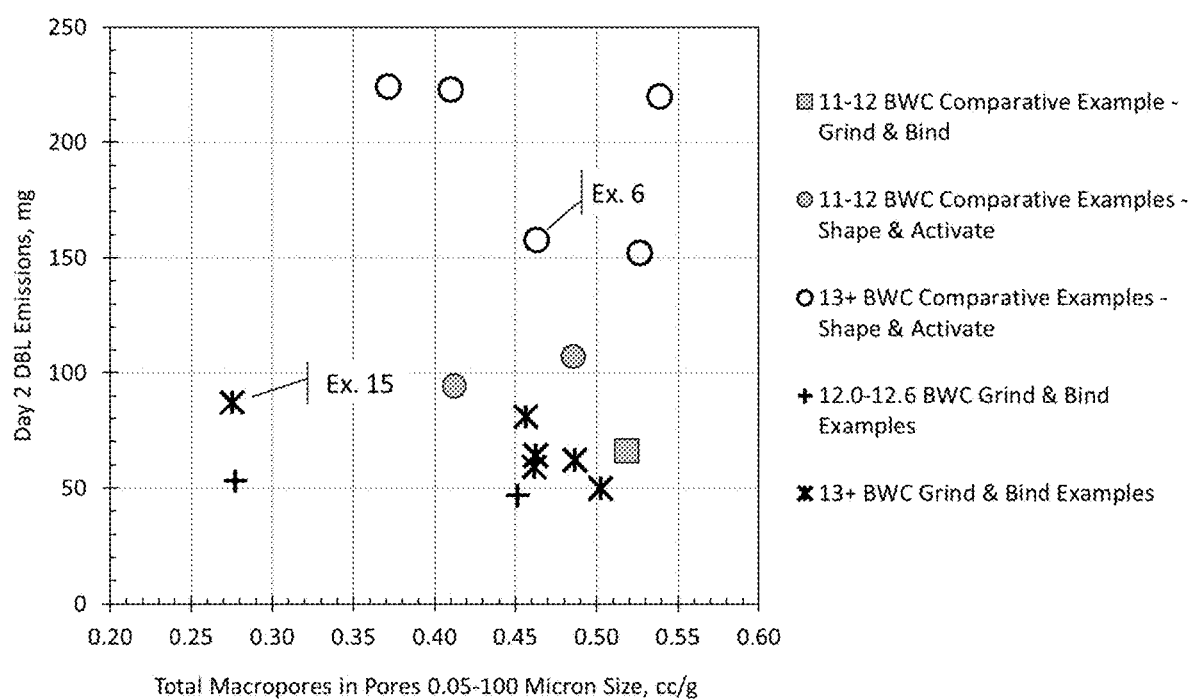
FIG. 14 shows the day 2 DBL emissions by BETP as a function of the total macropores 0.05-100 microns in size in units of cc/g, for comparative commercial examples and for grind & bind examples 9 through 16.
Figure 15:
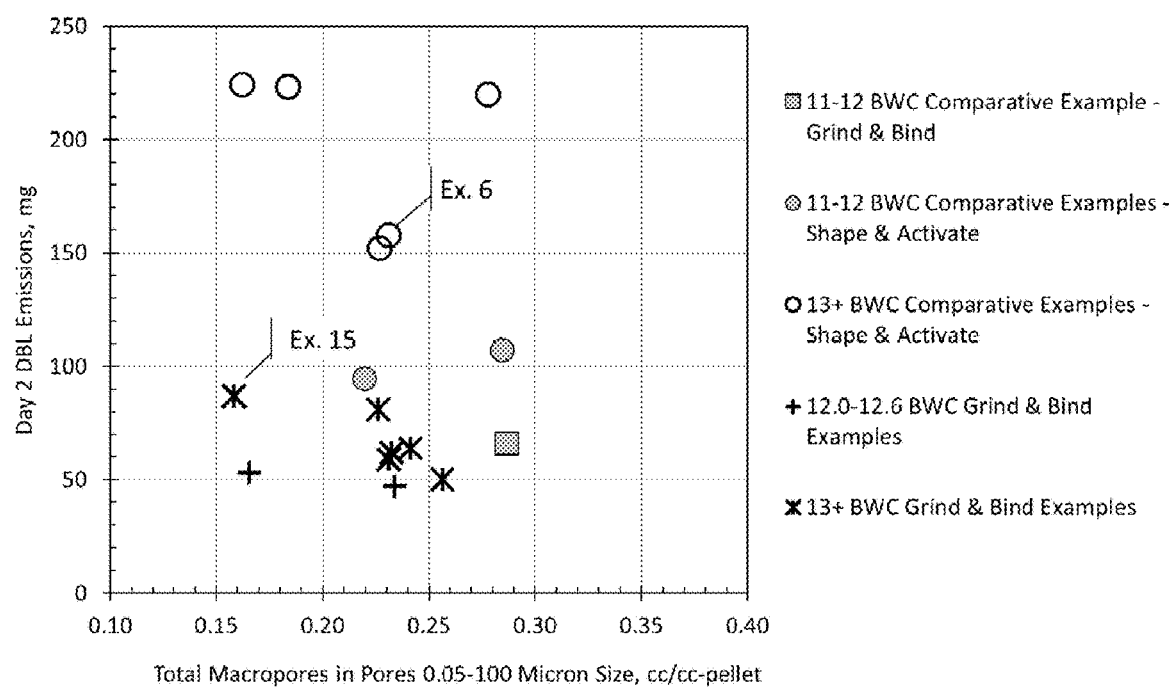
FIG. 15 shows the day 2 DBL emissions by BETP as a function of the total macropores 0.05-100 microns in size in units of cc/cc-pellet, for comparative commercial examples and for grind & bind examples 9 through 16.
Figure 16:
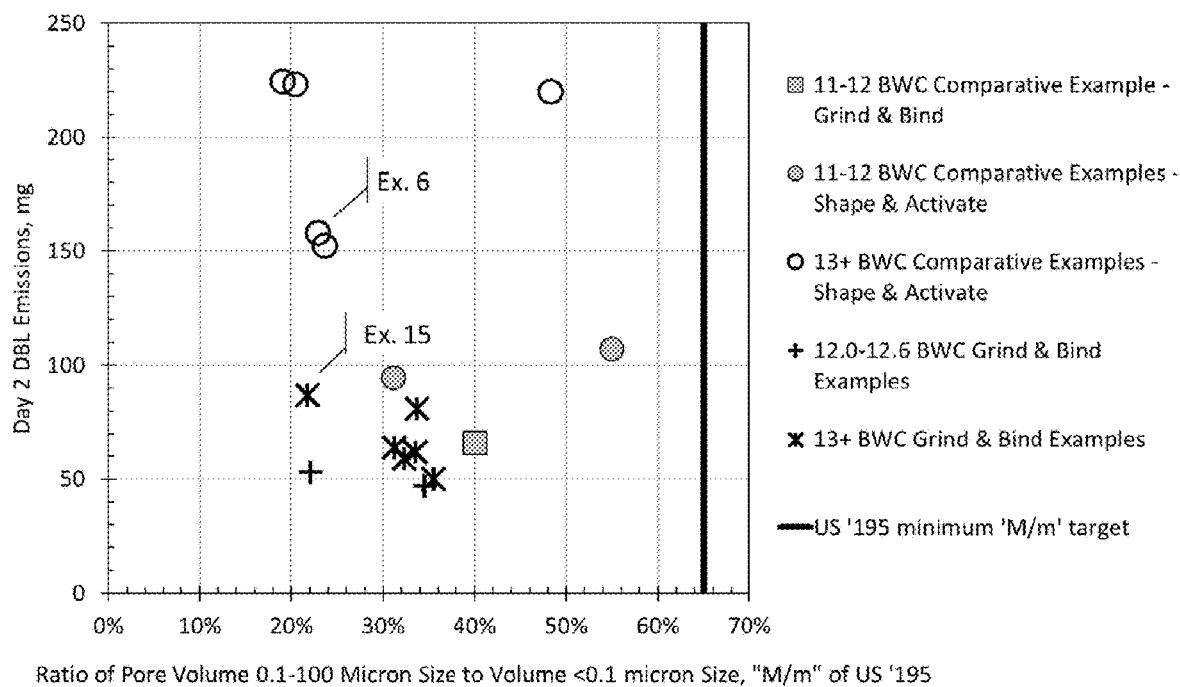
FIG. 16 shows the day 2 DBL emissions by BETP as a function of the ratio of the volume of total macropores 0.1-100 microns in size to the volume of pores less than 0.1 in size, for comparative commercial examples and for grind & bind examples 9 through 16.
Figure 17:
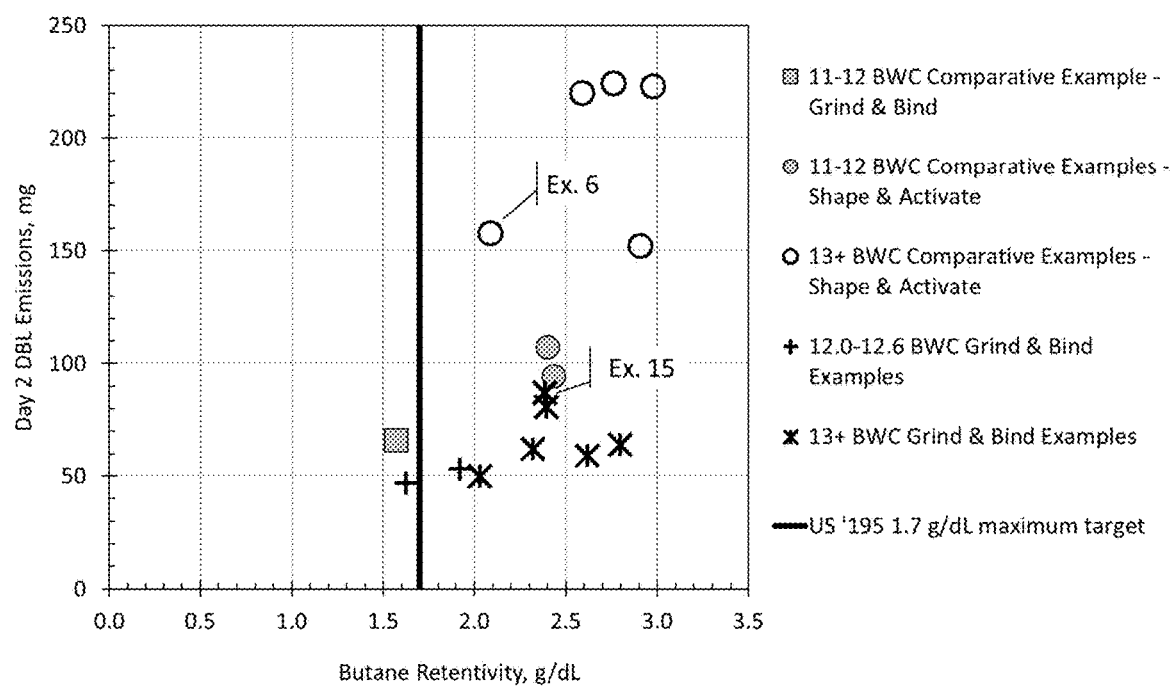
FIG. 17 shows the day 2 DBL emissions by BETP as a function of butane retentivity, for comparative commercial examples and for grind & bind examples 9 through 16.

In attempting to understand the unexpected low DBL emission result of grind & bind as compared with shape & activate at the high BWC, a close study was conducted of the total macropore volume on both a cc/g and a cc/cc-particle basis, of the g/dL butane retentivity from the ASTM BWC test, and of the ratio of the total macropore volume to the pore volume in the adsorptive pore size range (i.e., ratio of the volume 0.1-100 micron in size to the volume<0.1 micron, the "M/m" ratio in U.S. Pat. No. 9,174,195, or "US '195"). This analysis further showed the low DBL emission result to be unexpected. For example, FIGS. 14 and 15 show that the total macropore volume is not a predictor of DBL emissions performance. The 13+ g/dL BWC grind & bind examples 11 through 16 with low emissions have the same range of total macropore volume on both a cc/g-carbon basis and a cc/cc-particle basis as the comparative examples 4 through 8 with high DBL emissions also of 13+ g/dL ASTM BWC but made by shape & activate processes. In US '195, the ratio of total macropore volume 0.1-100 micron in size to "micropore" volume<0.1 micron in size is taught as optimized within a range of 65-150% for an adsorbent to be used near the atmospheric port. However, as shown in FIG. 16, the M/m properties of the low DBL emission grind & bind examples are the same as those of the comparative examples. The low DBL emissions obtained were outside of the 65-150% M/m range taught by U.S. Pat. No. 9,174,195. Notably and as highlighted in FIG. 16, the low DBL emission grind & bind example 15 was actually farther from the optimum M/m range compared with its precursor carbon, comparative example 6. Additionally, a maximum retentivity target of 1.7 g/dL is cited US '195 for an adsorbent to be used near the atmospheric port. However, as shown in FIG. 17, grind & bind examples 9 through 16 and comparative examples 1 through 8 have a similar range of retentivities of about 2-3 g/dL. Notably and as highlighted in FIG. 17, the low DBL emission grind & bind example 15 actually has higher retentivity compared with its precursor carbon, comparative example 6.

Such a lower DBL emission performance characteristic while providing high working capacity is of great benefit to the designers of evaporative emission control canisters, as one skilled in the art would understand, for allowing the use of less costly, smaller size, and less complex approaches for meeting emissions requirements while still providing high working capacity for vapor recovery, especially in the face of the challenges imposed by the aforementioned advances in powertrains and air/fuel mixture and flow rate management (e.g., hybrid, HEV, turbocharged engines, turbo-assisted engines, and GDI engines) and in the face of ever stricter fuel vapor emission regulations. For example, one embodiment is to simplify a canister system, such as in U.S. Pat. No. 9,732,649, where the presently described shaped adsorbent materials replaces the 1800 cc of BAX 1500 in the main canister type #1 (similar to the volume fill locations of 201, 202, and 203 in FIG. 4), generating less of a DBL emission challenge for the multiple auxiliary chambers and thereby providing target emissions performance for the system with fewer such auxiliary chambers (e.g., eliminating adsorbent 301 or 302 n auxiliary chamber 300 in FIG. 4). Another embodiment, such as in U.S. Pat. No. 9,732,649, would alternatively simplify the main canister fill of main canister type #1 by the use of 2100 cc of the high working capacity inventive adsorbent as the sole adsorbent in the main canister chambers, eliminating the production complexity of filling the canister with multiple types of adsorbents and eliminating the expense of high cost low working capacity bleed emission pellets in the 300 cc on the vent-side of that example system (e.g., have volumes 201 and 202 in FIG. 1 filled with the one inventive adsorbent, rather than volumes 201-203 in FIG. 3 with a conventional high working capacity adsorbent in combination with volume 204 containing low working capacity, low bleed emission pellets). In certain canister system embodiments containing the presently described shaped adsorbent materials, the target of less than 20 mg day 2 DBL emissions is met when tested with less than 210 liters, or with less than 100 bed volumes, purge applied after the 40 g/hr butane loading step, as determined by the 2012 California Bleed Emissions Test Procedure (BETP).

Another embodiment uses the high working capacity presently described shaped adsorbent material pellets in an auxiliary canister, as taught in U.S. Pat. No. 9,657,691 as a replacement for the conventional 13+ g/dL BWC pellets (e.g., similar to the adsorbent fill 301 in auxiliary canister 300 in FIG. 4). By doing so for the system shown in U.S. Pat. No. 9,657,691, the need for the heating of a subsequent volume of lower 6-10 g/dL BWC adsorbent (e.g., volume 302 in FIG. 4) may be eliminated, or the subsequent adsorbent may be eliminated entirely.

TABLE 1

| Example | Ex. 1 | Ex. 2 | Ex. 3 | Ex. 4 | Ex. 5 | Ex. 6 | Ex. 7 | Ex. 8 |
|---|---|---|---|---|---|---|---|---|
| Pellet Preparation Method | Grind & Bind | Shape & Act | Shape & Act | Shape & Act | Shape & Act | Shape & Act | Shape & Act | Shape & Act |
| Product Grade | BAX 1100 LD | CNR 115 | KMAZ2 | 3GX | BAX 1500E | BAX 1500 | KMAZ3 | BAX 1700 |
| PV <1.8 nm, cc/g | 0.157 | 0.327 | 0.225 | 0.011 | 0.178 | 0.289 | 0.313 | 0.241 |
| PV 1.8-5 nm, cc/g | 0.625 | 0.471 | 0.632 | 0.968 | 0.996 | 0.967 | 0.969 | 1.157 |
| PV 5-50 nm, cc/g | 0.342 | 0.045 | 0.251 | 0.060 | 0.307 | 0.253 | 0.272 | 0.168 |
| PV 0.05-1 micron, cc/g | 0.468 | 0.029 | 0.156 | 0.197 | 0.359 | 0.250 | 0.190 | 0.170 |
| PV 1-100 micron, cc/g | 0.051 | 0.456 | 0.257 | 0.342 | 0.167 | 0.213 | 0.220 | 0.197 |
| Particle Density <100 micron, cc/g | 0.553 | 0.586 | 0.533 | 0.516 | 0.431 | 0.499 | 0.448 | 0.442 |
| PV <1.8 nm, cc/cc | 0.087 | 0.192 | 0.120 | 0.006 | 0.077 | 0.144 | 0.140 | 0.107 |
| PV 1.8-5 nm, cc/cc | 0.346 | 0.276 | 0.337 | 0.500 | 0.429 | 0.483 | 0.434 | 0.511 |
| PV 5-50 nm, cc/cc | 0.189 | 0.026 | 0.134 | 0.031 | 0.132 | 0.126 | 0.122 | 0.074 |
| PV 0.05-1 micron, cc/cc | 0.259 | 0.017 | 0.083 | 0.102 | 0.155 | 0.125 | 0.085 | 0.075 |
| PV 1-100 micron, cc/cc | 0.028 | 0.267 | 0.137 | 0.176 | 0.072 | 0.106 | 0.098 | 0.087 |
| PV <0.1 micron, cc/g | 1.14 | 0.86 | 1.13 | 1.05 | 1.52 | 1.54 | 1.59 | 1.58 |
| PV 0.1-100 micron, cc/g | 0.456 | 0.473 | 0.350 | 0.507 | 0.361 | 0.353 | 0.324 | 0.300 |
| PV 0.05-100 micron, cc/g | 0.519 | 0.486 | 0.412 | 0.539 | 0.526 | 0.463 | 0.410 | 0.367 |
| PV 0.05-100 micron, cc/cc | 0.287 | 0.285 | 0.220 | 0.278 | 0.227 | 0.231 | 0.184 | 0.162 |
| PV % 0.05-1 micron/0.05-100 micron | 90% | 6% | 38% | 37% | 68% | 54% | 46% | 46% |
| PV % 0.05-0.5 micron/0.05-100 micron, "M/M" | 59% | 5% | 31% | 19% | 60% | 43% | 40% | 35% |
| PV % 0.1-100 micron/<0.1 micron, "M/m" | 40% | 55% | 31% | 48% | 24% | 23% | 20% | 19% |
| Apparent Density, g/cc | 0.319 | 0.367 | 0.341 | 0.332 | 0.300 | 0.285 | 0.299 | 0.290 |
| Butane Activity, g/100 g | 40.1 | 38.6 | 41.9 | 50.2 | 57.7 | 62.0 | 63.9 | 68.3 |

TABLE 1-continued

| Example | Ex. 1 | Ex. 2 | Ex. 3 | Ex. 4 | Ex. 5 | Ex. 6 | Ex. 7 | Ex. 8 |
|---|---|---|---|---|---|---|---|---|
| ASTM BWC, g/dL | 11.23 | 11.77 | 11.84 | 14.08 | 14.40 | 15.58 | 16.12 | 17.05 |
| Butane Purge Ratio | 0.877 | 0.830 | 0.829 | 0.844 | 0.830 | 0.883 | 0.844 | 0.860 |
| Retentivity, g/dL | 1.59 | 2.40 | 2.43 | 2.59 | 2.91 | 2.09 | 2.98 | 2.76 |
| Fuel Tank Size for DBL Test, gal | 15 | 15 | 15 | 20 | 20 | 20 | 20 | 20 |
| Tank Ullage, gal | 11.0 | 11.0 | 11.0 | 12.8 | 12.8 | 12.8 | 12.8 | 14.4 |
| Day 1 Load, g | 24.8 | 29.6 | 27.3 | 33.1 | 31.3 | 32.7 | 36.0 | 36.2 |
| Day 2 Load, g | 25.8 | 28.0 | 25.4 | 30.9 | 28.8 | 32.5 | 35.5 | 35.4 |
| Day 2 DBL Emissions, mg | 66 | 107 | 94 | 220 | 152 | 158 | 223 | 224 |

TABLE 2

| Example | Ex. 9 | Ex. 10 | Ex. 11 | Ex. 12 | Ex. 13 | Ex. 14 | Ex. 15 | Ex. 16 |
|---|---|---|---|---|---|---|---|---|
| Pellet Preparation Method | Grind & Bind | Grind & Bind | Grind & Bind | Grind & Bind | Grind & Bind | Grind & Bind | Grind & Bind | Grind & Bind |
| PV <1.8 nm, cc/g | 0.163 | 0.150 | 0.161 | 0.276 | 0.178 | 0.272 | 0.163 | 0.300 |
| PV 1.8-5 nm, cc/g | 0.760 | 0.663 | 0.789 | 0.759 | 0.792 | 0.799 | 0.760 | 0.819 |
| PV 5-50 nm, cc/g | 0.160 | 0.292 | 0.207 | 0.141 | 0.210 | 0.156 | 0.160 | 0.136 |
| PV 0.05-1 micron, cc/g | 0.418 | 0.254 | 0.476 | 0.438 | 0.459 | 0.430 | 0.247 | 0.429 |
| PV 1-100 micron, cc/g | 0.033 | 0.024 | 0.027 | 0.027 | 0.027 | 0.032 | 0.028 | 0.033 |
| Particle Density <100 micron, cc/g | 0.518 | 0.596 | 0.511 | 0.486 | 0.478 | 0.500 | 0.574 | 0.521 |
| PV <1.8 nm, cc/cc | 0.084 | 0.089 | 0.082 | 0.134 | 0.085 | 0.136 | 0.093 | 0.156 |
| PV 1.8-5 nm, cc/cc | 0.394 | 0.395 | 0.403 | 0.369 | 0.378 | 0.400 | 0.436 | 0.427 |
| PV 5-50 nm, cc/cc | 0.083 | 0.174 | 0.106 | 0.069 | 0.100 | 0.078 | 0.092 | 0.071 |
| PV 0.05-1 micron, cc/cc | 0.217 | 0.151 | 0.243 | 0.213 | 0.219 | 0.215 | 0.142 | 0.224 |
| PV 1-100 micron, cc/cc | 0.017 | 0.014 | 0.014 | 0.013 | 0.013 | 0.016 | 0.016 | 0.017 |
| PV <0.1 micron, cc/g | 1.09 | 1.12 | 1.20 | 1.19 | 1.22 | 1.24 | 1.09 | 1.27 |
| PV 0.1-100 micron, cc/g | 0.377 | 0.247 | 0.425 | 0.400 | 0.409 | 0.400 | 0.238 | 0.396 |
| PV 0.05-100 micron, cc/g | 0.451 | 0.277 | 0.502 | 0.465 | 0.486 | 0.461 | 0.275 | 0.463 |
| PV 0.05-100 micron, cc/cc | 0.234 | 0.165 | 0.256 | 0.226 | 0.232 | 0.231 | 0.158 | 0.241 |
| PV % 0.05-1 micron/0.05-100 micron | 93% | 91% | 95% | 94% | 94% | 93% | 90% | 93% |
| PV % 0.05-0.5 micron/0.05-100 micron, "M/M" | 86% | 38% | 76% | 63% | 92% | 64% | 58% | 85% |
| PV % 0.1-100 micron/<0.1 micron, "M/m" | 35% | 22% | 35% | 34% | 33% | 32% | 22% | 31% |
| Apparent Density, g/cc | 0.340 | 0.380 | 0.319 | 0.325 | 0.322 | 0.324 | 0.366 | 0.320 |
| Butane Activity, g/100 g | 41.8 | 36.5 | 49.5 | 50.2 | 50.4 | 51.2 | 46.4 | 54.6 |
| ASTM BWC, g/dL | 12.60 | 11.97 | 13.75 | 13.91 | 13.91 | 13.97 | 14.60 | 14.67 |
| Butane Purge Ratio | 0.884 | 0.861 | 0.872 | 0.854 | 0.857 | 0.842 | 0.860 | 0.840 |
| Retentivity, g/dL | 1.62 | 1.92 | 2.03 | 2.39 | 2.32 | 2.62 | 2.39 | 2.80 |
| Fuel Tank Size for DBL Test, gal | 15 | 15 | 20 | 20 | 20 | 20 | 20 | 20 |
| Tank Ullage, gal | 11.0 | 11.0 | 12.8 | 12.8 | 12.8 | 12.8 | 12.8 | 12.8 |
| Day 1 Load, g | 24.1 | 24.9 | 32.6 | 34.0 | 33.4 | 33.8 | 31.1 | 37.0 |

TABLE 2-continued

| Example | Ex. 9 | Ex. 10 | Ex. 11 | Ex. 12 | Ex. 13 | Ex. 14 | Ex. 15 | Ex. 16 |
| --- | --- | --- | --- | --- | --- | --- | --- | --- |
| Day 2 Load, g | 23.6 | 24.8 | 31.5 | 33.1 | 31.8 | 30.6 | 28.8 | 34.0 |
| Day 2 DBL Emissions, mg | 47 | 53 | 50 | 81 | 62 | 59 | 87 | 64 |

Determination of Apparent Density, BWC, and Powder Butane Activity

The standard method ASTM D 2854 (hereinafter "the Standard Method") may be used to determine the nominal volume apparent density of particulate adsorbents, such as granular and pelletized adsorbents of the size and shape typically used for evaporative emission control for fuel systems.

The standard method ASTM D5228 may be used to determine the nominal volume butane working capacity (BWC) of the adsorbent volumes containing particulate granular and/or pelletized adsorbents. The butane retentivity is calculated as the difference, in units of g/dL, between the volumetric butane activity (i.e., the g/cc apparent density multiplied by the g/100 g butane activity) and the g/dL BWC.

For powdered activated carbon ingredients for extrusion, a powder butane activity ("pBACT") may be measured by number of ways that one skilled in the art would recognize as equivalent for ascertaining that value, i.e., the equilibrated gram weight capacity of the oven dried powder sample when exposed to 1.00 atm partial pressure of n-butane, for the sample thermostatted at 25° C. One suitable alternative for pBACT, for example, is based on the ASTM 5228 method, where the weight pick-up is measured for a smaller-than-normal amount of dried sample (0.50-1.00 g) in order to allow unimpeded flow of n-butane gas through the sample holder tube during the saturation step. By this method, as was used for Examples 9 through 16, a plug of glass wool is used for retaining the powder activated carbon sample in the sample tube. In determining the weight pick-up of n-butane by the sample from adsorption, a weight correction is applied (i.e., subtracted from the total sample holder weight gain from the butane saturation step) in order to account for the contribution to the total weight gain of the sample holder tube due to the difference in density of air in the holder initially in the gas phase, and thereby more accurately define the weight gain of n-butane by the carbon sample due to adsorption. (Normally, this air displacement correction for the butane activity measurement for the 16.7 mL granular or pellet adsorbent volume in the sample holder tube is not applied according to ASTM 5228, perhaps because the adsorbed weight of butane is very large relative to the potential air displacement correction. However, the small sample size required for the testing of a small amount of adsorbent powder in the flow apparatus requires that the air displacement be taken to account for accurately determining the adsorption capacity of the powder.) The gas phase butane displacement weight correction is made with the Ideal Gas Law (PV=nRT) for calculating the weight difference for that volume filled with air initially versus filled with n-butane gas upon saturation. The pressure, P, is 1 atm, the volume, V, is the empty sample holder volume in cc as determined separately by a method such as water fill, the temperature T is the 298 K, and R is the gas constant (82.06 cc atm/K gmole). The value of the number of gas phase gmoles, n, is calculated for the sample tube (neglecting the de minimis correction to the empty tube volume from the skeletal volume of the adsorbent sample and the volume of condensed butane adsorbate in the adsorbent porosity). The weight correction is the difference in mass between air (28.8 g/gmole) versus the heavier n-butane (58.1 g/gmole) for that Ideal Gas Law-calculated gmole value.

Determination of Diurnal Breathing Loss (DBL) Emissions According to a BETP Test The evaporative emission control systems in the examples were tested by a protocol that include the following. The defined 2.1 L canister (herein and in the claims a, "Defined Canister") that is used for generating the data in FIGS. 5 and 6 has, as shown in FIG. 1, a 1.4 L adsorbent volume 201 with about a 19.5 cm height above the support screen 102 (e.g., 'h'), plus a 0.7 L adsorbent volume 202 with about a 19.5 cm height above the support screen 102. The 1.4 L adsorbent volume 201 has an average width of 9.0 cm from the dividing wall 103 to the side wall of the canister (e.g., 'w'), and the 0.7 L adsorbent volume 202 has an average width of 4.5 cm from the dividing wall 103 to its sidewall. Both adsorbent volumes 201 and 202 have a similar depth (into the page in FIG. 1) of 8.0 cm.

Each example adsorbent fill was uniformly preconditioned (aged) by repetitive cycling of gasoline vapor adsorption using certified Tier 3 fuel (8.7-9.0 RVP, 10 vol % ethanol) and 300 nominal bed volumes of dry air purge at 22.7 LPM based on the main canister (e.g., 630 liters for a 2.1 L main canister). (The U.S. RE38,844 work was conducted with certified TF-1 fuel.) The gasoline vapor load rate was 40 g/hr and the hydrocarbon composition was 50 vol %, generated by heating two liters of gasoline to about 38° C. and bubbling air through at 200 ml/min. The two-liter aliquot of fuel was replaced automatically with fresh gasoline every 1 hr 55 min until 5000 ppm breakthrough as butane was detected by an FID (flame ionization detector) or infrared detector. A minimum of 25 aging cycles were used on a virgin canister. The gasoline working capacity (GWC) may be measured as the average weight loss of purged vapors for the last 2-3 cycles and is reported as grams per liter of adsorbent volumes in the canister system. In proceeding further to measure bleed emission performance, the GWC aging cycles were followed by a single butane adsorption/air purge step. This step was to load butane at 40 g/hour at a 50 vol % concentration in air at one atm to 5000 ppm breakthrough, soak for one hour, then purge with dry air for 21 minutes with a total purge volume attained by selecting the appropriate constant air purge rate for that period. The canister was then soaked with the ports sealed for about 18-20 hrs at about 25° C. (where 24 hrs is the midpoint of the requirement for the soak time). For the DBL data in FIGS. 5-6, 8-9, and 12-17, the total purge volume following the above single butane adsorption loading was 315 L, equivalent to 150 BV for the 2.1 L adsorbent fill of the defined canister.

The DBL emissions were subsequently generated by attaching the tank port of the example to a fuel tank filled with CARB LEV III fuel (6.9-7.2 RVP, 10% ethanol). (The U.S. RE38,844 work was conducted CARB Phase II fuel.)

It is notable that, in order to appropriately challenge canister systems for the size fuel tank for which their working capacity would be leveraged in practice (i.e., by providing a more realistic diurnal vapor load, and thereby generating appropriately comparable emissions data), smaller fuel tanks with smaller ullage were employed for the canister systems containing the examples with <12.6 g/dL ASTM BWC. That is, the canister systems with 13+ g/dL ASTM BWC had appropriately greater loading challenges during the diurnal test for emissions control because of the larger size tanks and larger size ullage to which they were connected, i.e., for a given ASTM BWC fill, an otherwise undersized tank system would be underchallenged. In detail, the <12.6 g/dL ASTM BWC canister system examples were connected to a 15 gallon tank filled with 4 gallons of liquid fuel (11.0 gal ullage). The 13.7-16.1 g/dL ASTM BWC canister system examples were connected to a 20 gallon tank filled with 7.2 gallons of liquid fuel (12.8 gal ullage). The 17.1 g/dL ASTM BWC canister system example was connected to a 20 gallon tank filled with 5.6 gallons of liquid fuel (14.4 gal ullage), thereby providing the larger ullage space needed for this extremely high ASTM BWC canister fill, but with an existing 20 gallon-size tank.

Prior to attachment, the filled fuel tank had been stabilized at 18.3° C. for 18-20 hours while venting (where 24 hrs is the midpoint of the requirement of the soak time while venting). The tank and the canister system were then temperature-cycled per CARB's two-day temperature profile, each day from 18.3° C. to 40.6° C. over 11 hours, then back down to 18.3° C. over 13 hours. Emission samples were collected from the example vent at 6 hours and 12 hours during the heat-up stage into Kynar bags (The U.S. RE38,844 work had sample collection at 5.5 and 11 hours). The Kynar bags were filled with nitrogen to a known total volume based on pressure and then evacuated into a FID to determine hydrocarbon concentration. The FID was calibrated with a precisely known-butane standard of about 5000 ppm concentration. From the Kynar bag volume, the emissions concentration, and assuming an ideal gas, the mass of emissions (as butane) was calculated. For each day, the mass of emissions from the two readings were added. Following CARB's protocol the day with the highest total emissions was reported as "2-day emissions." In all cases, the highest emissions were on Day 2. This procedure is generally described in SAE Technical Paper 2001-01-0733, titled "Impact and Control of Canister Bleed Emissions," by R. S. Williams and C. R. Clontz, and in CARB's LEV III BETP procedure (section D.12 in California Evaporative Emissions Standards and Test Procedures for 2001 and Subsequent Model Motor Vehicles, Mar. 22, 2012).

Determination of Working Capacity and Emissions According to a China 6 Type Test Procedure (Herein and in the Claims, the "China 6 Type Test Procedure")

Preconditioning Step. The canister system is aged by bubbling air at a rate of 200 ml/min through 2 liters of EPA Tier III fuel (9 RVP, 10% ethanol) heated to 38° C. The air flow rate is controlled using a mass flow controller. Under these conditions, the vapor generation rate is about 40 g/h and the hydrocarbon concentration was approximately 50% (volume). These vapors are introduced to the canister until breakthrough of 5000 ppm is detected at the atmospheric port (if breakthrough is not detected after 90 minutes, the gasoline is replaced). Within 2 minutes, the canister system is then purged with pressurized dry air into the atmospheric port and out of the purge (engine) port at a rate of 22.7 liters/min for 300 bed volumes. This sequence is repeated for a total of at least 35 cycles. The resulting GWC is then calculated as the average of the last three load and purge cycles and does not include the 2 g of breakthrough. The test canisters is then loaded with 50:50 vol % butane-nitrogen at a rate of 40 g/h butane to a 2 g breakthrough equivalent.

Elevated Temperature Soak Step. Mimicking the expected vapor space of a 70 L PATAC 358 tank (filled to 40%), a 68 L tank is filled with 25.7 L (38%) of EPA Tier III fuel (9 RVP, 10% ethanol). The canister system is then connected to the tank and the entire system is then placed in a temperature-controlled chamber (already preheated to 38° C.) for about 22 hrs. In order to avoid chamber contamination and to be able to measure the canister breakthrough amount during this heat build and high temperature soak step, the canister system is vented into a "slave canister" (2.1 L Nuchar® BAX 1500) of low restriction.

Elevated Temperature Purge. The canister system, while remaining in the heated chamber, is now purged with vacuum for 19.5 min. During this time, the vacuum level was adjusted to maintain a flow rate of −25 L/min (incoming air) in order to achieve a theoretical purge air target of 487.5 L. The total flow (including removed hydrocarbons) is simultaneously measured outside the chamber with a dry gas meter. Following this purge cycle, the system is now allowed to rest at 38° C. for 1 hr; hot soak emissions are not measured during this period, due to the nature of this system test compared with the actual vehicle test of the full vehicle test protocol (no temperature gradient present without an actual vehicle).

20° C. Soak and 2-Day-Diurnal. The chamber is then opened to record the canister weight and to adjust the temperature to 20° C. for the upcoming soak period (6-36 hrs). Subsequent to this soak, the canister is again weighed and re-connected to the tank for the diurnal emission test. A Kynar® bag is connected to the atmospheric port of the canister system, and the chamber is programmed to control the temperature based on the EU diurnal temperature profile (20→35→20° C.). After 6 hrs, the bag is removed and replaced with a new one (e.g., a single bag is typically insufficient in size to capture the full 12 hrs of emissions). The emissions in the removed Kynar® bag are measured by a flame ionization detector (FID). After 12 hrs, the second Kynar® bag is removed, and the emissions are also measured. The canister is weighed and reconnected to the tank. During the cool-down portion of the diurnal cycle, no bag is attached to the canister system in order to allow for back-purge. The same procedure is repeated on the second day. The test is stopped after the heat-up portion (12 hr) of the second day. The day 2 emissions are the total emissions from that second day as captured by the two Kynar® bags and measured by FID.

Determination of Pore Volumes and Surface Areas

Volume of pores (PV)<1.8 nm to 100 nm in size is measured by nitrogen adsorption porosimetry by the nitrogen gas adsorption method ISO 15901-2:2006 using a Micromeritics ASAP 2420 (Norcross, Ga.). Because of the correlation of ASTM BWC with pores 1.8-5.0 nm in size, the definition of total mesopores herein are pores 1.8-50 nm in size (divided between small mesopores 1.8-5 nm and larger mesopores 5-50 nm in size), compared with the IUPAC definition total mesopores as pore 2.0-50 nm in size. Accordingly, the micropore definition herein is pores<1.8 nm in size, as compared with the IUPAC definition of pores<2.0 nm in size. "Micropores" as referred in U.S. Pat. No. 9,174,195 for the pore volume value "m" are pores with a size of less than about 100 nm. The sample preparation procedure for nitrogen adsorption testing was to degas to a pressure of less than 10 μmHg. The determination of pore volumes for pores<1.8 nm to 100 nm in size was from the desorption branch of the 77 K isotherm for a 0.1 g sample. The nitrogen adsorption isotherm data was analyzed by the Kelvin and Halsey equations to determine the distribution of pore volume with pore size of cylindrical pores according to the model of Barrett, Joyner, and Halenda ("BJH"). The non-ideality factor was 0.0000620. The density conversion factor was 0.0015468. The thermal transpiration hard-sphere diameter was 3.860 Å. The molecular cross-sectional area was 0.162 nm$^2$. The condensed layer thickness (Å) related to pore diameter (D, Å) used for the calculations was 0.4977 $[\ln(D)]^2$−0.6981 ln(D)+2.5074. Target relative pressures for the isotherm were the following: 0.04, 0.05, 0.085, 0.125, 0.15, 0.18, 0.2, 0.355, 0.5, 0.63, 0.77, 0.9, 0.95, 0.995, 0.95, 0.9, 0.8, 0.7, 0.6, 0.5, 0.45, 0.4, 0.35, 0.3, 0.25, 0.2, 0.15, 0.12, 0.1, 0.07, 0.05, 0.03, 0.01. Actual points were recorded within an absolute or relative pressure tolerance of 5 mmHg or 5%, respectively, whichever was more stringent. Time between successive pressure readings during equilibration was 10 seconds. Volumetric pore volumes in units of cc per cc-pellet were obtained by multiplying the gravimetric pore volume in units of cc/g by the particle density<100 microns in units of g/cc, as obtained by Hg porosimetry.

Macroscopic pore volume in pores 0.05-100 microns in size and particle density is measured by mercury intrusion porosimetry method ISO 15901-1:2016. The equipment used for the examples was a Micromeritics Autopore V (Norcross, Ga.). Samples used were around 0.4 g in size and pre-treated for at least 1 hour in an oven at 105° C. The surface tension of mercury and contact angle used for the Washburn equation were 485 dynes/cm and 130°, respectively. Macropores as referred to herein, are those that have a pore size or width of from about 0.05 to 100 microns. For calculating the M/m of U.S. Pat. No. 9,174,195, the total macropore volume 'M' was for pores of 0.1 to 100 microns in size. Volumetric pore volumes in units of cc per cc-pellet (cc/cc) were obtained by multiplying the gravimetric pore volume (units of cc/g) by the particle density<100 microns in size (units of g/cc), as obtained by Hg intrusion porosimetry.

Determination of Incremental Adsorption Capacity

McBain method. The representative adsorbent component sample ("adsorbent sample") is oven-dried for more than 3 hours at 110° C. before loading onto a sample pan attached to a spring inside a sample tube. Then, the sample tube is installed into an apparatus as described. The adsorbent sample shall include representative amounts of any inert binders, fillers and structural components present in the nominal volume of the adsorbent component when the Apparent Density value determination equivalently includes the mass of the inert binders, fillers, and structural components in its mass numerator. Conversely, the adsorbent sample shall exclude these inert binders, fillers, and structural components when the Apparent Density value equivalently excludes the mass of the inert binders, fillers, and structural components in its numerator. The universal concept is to accurately define the adsorptive properties for butane on a volume basis within the nominal volume.

A vacuum of less than 1 torr is applied to the sample tube, and the adsorbent sample is heated at 105° C. for 1 hour. The mass of the adsorbent sample is then determined by the extension amount of the spring using a cathetometer. After that, the sample tube is immersed in a temperature-controlled water bath at 25° C. Air was pumped out of the sample tube until the pressure inside the sample tube is 10$^{-4}$ torr. n-Butane is introduced into the sample tube until equilibrium was reached at a selected pressure. The tests are performed for two data sets of four selected equilibrium pressures each, taken about 38 torr and taken about 380 torr. The concentration of n-butane is based on the equilibrium pressure inside the sample tube. After each test at the selected equilibrium pressure, the mass of the adsorbent sample is measured based on the extension amount of the spring using cathetometer. The increased mass of the adsorbent sample is the amount of n-butane adsorbed by the adsorbent sample. The mass of n-butane absorbed (in gram) per the mass of the adsorbent sample (in gram) is determined for each test at different n-butane equilibrium pressures and plotted in a graph as a function of the concentration of n-butane (in % volume). A 5 vol % n-butane concentration (in volume) at one atmosphere is provided by the equilibrium pressure inside the sample tube of 38 torr. A 50 vol % n-butane concentration at one atmosphere is provided by the equilibrium pressure inside the sample tube of 380 torr. Because equilibration at precisely 38 torr and 380 torr may not be readily obtained, the mass of adsorbed n-butane per mass of the adsorbent sample at 5 vol % n-butane concentration and at 50 vol % n-butane concentration is interpolated from a graph using the data points collected about the target 38 and 380 torr pressures. Alternatively, Micromeritics (such as Micromeritics ASAP 2020) may be used for determining the incremental butane adsorption capacity instead of the McBain method.

Exemplary Embodiments

In an aspect, the description provides a shaped adsorbent material comprising an admixture of a binder and an activated adsorbent powder prepared by grinding an activated adsorbent precursor, wherein the admixture is shaped into a form, and wherein the shaped adsorbent material has an ASTM BWC of at least 13 g/dL.

In an additional aspect, the description provides a shaped adsorbent material produced according to the steps comprising: providing an activated adsorbent precursor; grinding the activated adsorbent precursor to a powder, wherein the powder has a pBACT of at least about 50 g/100 g; admixing the powder with a binder material; and shaping the powder and binder material mixture into a form, wherein the shaped adsorbent material has an ASTM BWC of at least 13 g/dL.

In any of the aspects or embodiments of the shaped adsorbent material as described herein, activated adsorbent powder precursor of the described shaped adsorbent material has as butane activity (pBACT) of at least about 50 g/100 g. In any of the aspects or embodiments of the shaped adsorbent material as described herein, the activated adsorbent precursor is an activated carbon precursor. In any of the aspects or embodiments of the shaped adsorbent material as described herein, the shaped adsorbent material comprises a ratio of pore volumes of 0.05-1 micron to 0.05-100 microns that is greater than about 80%.

In any of the aspects or embodiments of the shaped adsorbent material as described herein, the shaped adsorbent material comprises a ratio of pore volumes of 0.05-0.5 micron to 0.05-100 microns that is greater than about 50%.

In any of the aspects or embodiments of the shaped adsorbent material as described herein, the binder comprises at least one of an organic binder, an inorganic binder or both.

In any of the aspects or embodiments of the shaped adsorbent material as described herein, the organic binder is at least one of carboxymethyl cellulose (CMC), a synthetic organic binder or both.

In any of the aspects or embodiments of the shaped adsorbent material as described herein, the inorganic binder is a clay.

In any of the aspects or embodiments of the shaped adsorbent material as described herein, the binder is CMC and is present in an amount of less than about 8 wt %. all values in between.

In any of the aspects or embodiments of the shaped adsorbent material as described herein, the binder is bentonite clay and is present in an amount of from about 10 wt % to about 35 wt. all values in between.

In another aspect, the description provides an evaporative emission control canister system comprising at least one adsorbent volume, and including a shaped adsorbent material, as described herein, e.g., comprising an admixture of a binder and an activated adsorbent powder derived by grinding an activated adsorbent precursor, wherein the admixture is shaped into a form, and wherein the shaped adsorbent material has an ASTM BWC of at least 13 g/dL.

In any of the aspects or embodiments as described herein, the canister system comprises at least one fuel-side adsorbent volume and at least one vent-side adsorbent volume, wherein at least one of the at least one fuel-side adsorbent volumes or at least one vent-side adsorbent volumes or a combination thereof includes a shaped adsorbent material comprising an admixture of a binder and an activated adsorbent powder derived by grinding an activated adsorbent precursor, wherein the admixture is shaped into a form, and wherein the shaped adsorbent material has an ASTM BWC of at least 13 g/dL.

In any of the aspects or embodiments as described herein, the shaped adsorbent material of the canister system as described herein has at least one of: (i) a ratio of pore volumes of 0.05-1 micron to 0.05-100 microns that is greater than about 80%, (ii) a ratio of pore volumes of 0.05-0.5 micron to 0.05-100 microns that is greater than about 50%, or (iii) a combination thereof.

In any of the aspects or embodiments as described herein, the shaped adsorbent material as described herein has two-day diurnal breathing loss (DBL) emissions of 100 mg or less at 315 liters of purge applied after a 40 g/hr butane loading step as determined in a Defined Canister by the 2012 California Bleed Emissions Test Procedure (BETP).

In any of the aspects or embodiments as described herein, the canister system has two-day diurnal breathing loss (DBL) emissions of less than 100 mg when tested by the China 6 Type Test Procedure.

In any of the aspects or embodiments as described herein, the canister system comprises at least one vent-side adsorptive volume having at least one of: (i) an incremental adsorption capacity at 25° C. of from 4 grams n-butane/L to less than 35 grams n-butane/L between vapor concentrations of 5 vol % and 50 vol % n-butane, (ii) an effective BWC of less than 3 g/dL, (iii) a g-total BWC of less than 6 grams, or (iv) a combination thereof.

In any of the aspects or embodiments as described herein, the canister system comprises at least one fuel-side adsorptive volume having an incremental adsorption capacity at 25° C. of greater than 35 grams n-butane/L between vapor concentrations of 5 vol % and 50 vol % n-butane.

In any of the aspects or embodiments of the shaped adsorbent material as described herein, the activated carbon precursor is derived from at least one of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, a synthetic polymer, natural polymer, lignocellulosic material, or a combination thereof.

In any of the aspects or embodiments of the shaped adsorbent material as described herein, the form is selected from a pellet, granule, sphere, honeycomb, monolith, cylinder, particulate, hollow-cylinder, star, twisted spiral, asterisk, configured ribbon, or a combination thereof.

In any of the aspects or embodiments described herein, the evaporative emission control canister system has two-day diurnal breathing loss (DBL) emissions of 20 mg or less with no more than 315 liters of purge applied after a 40 g/hr butane loading step as determined by the 2012 California Bleed Emissions Test Procedure (BETP).

In any of the aspects or embodiments described herein, the evaporative emission control canister system has two-day diurnal breathing loss (DBL) emissions of 20 mg or less with no more than 150 BV of purge applied after a 40 g/hr butane loading step as determined by the 2012 California Bleed Emissions Test Procedure (BETP).

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the invention described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present invention will be apparent from the appended claims. Moreover, those skilled in the art will recognize, or be able to ascertain using no more than routine experimentation, many equivalents to the specific embodiments of the invention described herein. Such equivalents are intended to be encompassed by the following claims.

The invention claimed is:

1. An evaporative emission control canister system comprising:
　at least one adsorbent volume, and including a shaped adsorbent material comprising an admixture of a binder and an activated adsorbent powder having a butane activity (pBACT) of at least about 50 g/100 g, derived by grinding an activated adsorbent precursor, wherein the admixture is shaped into a form,
　wherein the shaped adsorbent material has an ASTM BWC of at least 13 g/dL, and at least one of: (i) a ratio of pore volumes of 0.05-1 micron to 0.05-100 microns that is greater than about 80%, (ii) a ratio of pore volumes of 0.05-0.5 micron to 0.05-100 microns that is greater than about 50%, or (iii) a combination thereof.

2. The evaporative emission control canister system of claim 1, wherein the canister system comprises at least one fuel-side adsorbent volume and at least one vent-side adsorbent volume, wherein at least one of the at least one fuel-side adsorbent volumes or at least one vent-side adsorbent volumes or a combination thereof includes the shaped adsorbent material of claim 1.

3. The evaporative emission control canister system of claim 1, wherein the shaped adsorbent material has two-day diurnal breathing loss (DBL) emissions of 100 mg or less at 315 liters of purge applied after a 40 g/hr butane loading step as determined in a Defined Canister by the 2012 California Bleed Emissions Test Procedure (BETP).

4. The evaporative emission control canister system of claim 1, wherein the system has two-day diurnal breathing loss (DBL) emissions of less than 100 mg when tested by China 6 Type Test Procedure.

5. The evaporative emission control canister system of claim 1, wherein the activated adsorbent precursor is an activated carbon precursor.

6. The evaporative emission control canister system of claim 1, wherein the binder comprises at least one of an organic binder, an inorganic binder or both.

7. The evaporative emission control canister system of claim 6, wherein the organic binder is at least one of carboxymethyl cellulose (CMC), a synthetic organic binder or both.

8. The evaporative emission control canister system of claim 6, wherein the inorganic binder is a clay.

9. The evaporative emission control canister system of claim 5, wherein the activated carbon precursor is derived from at least one of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, a synthetic polymer, natural polymer, lignocellulosic material, or a combination thereof.

10. The evaporative emission control canister system of claim 1, wherein the form is selected from a pellet, granule, sphere, honeycomb, monolith, cylinder, particulate, hollow-cylinder, star, twisted spiral, asterisk, configured ribbon, or a combination thereof.

11. The evaporative emission control canister system of claim 1, wherein the canister system comprises at least one vent-side adsorptive volume having at least one of: (i) an incremental adsorption capacity at 25° C. of from 4 grams n-butane/L to less than 35 grams n-butane/L between vapor concentrations of 5 vol % and 50 vol % n-butane, (ii) an effective BWC of less than 3 g/dL, (iii) a g-total BWC of less than 6 grams, or (iv) a combination thereof.

12. The evaporative emission control canister system of claim 1, wherein the canister system comprises at least one fuel-side adsorptive volume having an incremental adsorption capacity at 25° C. of greater than 35 grams n-butane/L between vapor concentrations of 5 vol % and 50 vol % n-butane.

13. The evaporative emission control canister system of claim 1, wherein the system has two-day diurnal breathing loss (DBL) emissions of 20 mg or less with no more than 315 liters of purge applied after a 40 g/hr butane loading step as determined by the 2012 California Bleed Emissions Test Procedure (BETP).

14. The evaporative emission control canister system of claim 1, wherein the system has two-day diurnal breathing loss (DBL) emissions of 20 mg or less with no more than 150 BV of purge applied after a 40 g/hr butane loading step as determined by the 2012 California Bleed Emissions Test Procedure (BETP).

* * * * *